INVENTORS
WILLIAM L. MC DERMID
ROBERT I. ROTH

BY Joe L. Koerber
ATTORNEY

March 22, 1966 W. L. McDERMID ETAL 3,242,468

ASSOCIATIVE MEMORY SYSTEM

Filed Dec. 26, 1961 13 Sheets-Sheet 4

ASSOCIATIVE MEMORY SYSTEM

Filed Dec. 26, 1961

13 Sheets-Sheet 6

March 22, 1966 W. L. McDERMID ET AL 3,242,468

ASSOCIATIVE MEMORY SYSTEM

Filed Dec. 26, 1961 13 Sheets-Sheet 7

March 22, 1966 W. L. McDERMID ETAL 3,242,468

ASSOCIATIVE MEMORY SYSTEM

Filed Dec. 26, 1961 13 Sheets-Sheet 8

March 22, 1966 W. L. McDERMID ETAL 3,242,468

ASSOCIATIVE MEMORY SYSTEM

Filed Dec. 26, 1961 13 Sheets-Sheet 10

3,242,468

ASSOCIATIVE MEMORY SYSTEM

William L. McDermid, Rochester, and Robert I. Roth, Briarcliff Manor, N.Y., assignors to International Business Machines Corporation, New York, N.Y., a corporation of New York Filed Dec. 26, 1961, Ser. No. 162,080
13 Claims. (Cl. 340—172.5)

The present invention relates to an associative memory system and more particularly to a system wherein data in an association input register and individual words of memory may be shifted character-by-character with the ability to associate after each character shift operation.

The usual associative memory consists essentially of a multiple word memory, an association input register (AIR), and means for comparing the contents of the AIR simultaneously with all words of the memory. In a fully associative memory the AIR is of the same length as the memory words and it is possible to associate the entire AIR contents with the entire words in memory on a bit position basis. By suitable masking a number of the bit positions of the AIR contents may be selected to be compared with corresponding bit positions of the memory words.

An associative tag memory consists of an AIR of lesser size than the memory words whereby the contents of the AIR can be compared with only selected portions, or tags, of the memory words.

Normally the memory words are fixed, that is, data stored therein is not changed, except during updating periods. In one embodiment of the present invention, data words are shifted into the memory and held there while other data words are shifted successively through an AIR in a character-by-character shifting manner for comparison with data words in the memory each time an AIR data word is aligned with the memory words.

In another embodiment, a multiple word AIR is provided and data are streamed through a shifting register in a character-by-character shifting manner. The data in the shifting register are compared with the data in the AIR after each character shift operation.

Accordingly, it is a primary object of this invention to provide a system having a word memory and data register capable of character-by-character shifting of data and comparison of data in the memory and register after each shift operation.

Another object of this invention is to provide an associative memory system having a multiple word memory and an association input register capable of character-by-character shifting of data and association after each shift.

A further object of this invention is to provide an associative memory system having an association input register and a multiple word memory, each word of memory being adapted for a character-by-character shifting data input and for association with data in the association input register after each shift operation.

Yet another object of this invention is to provide an associative memory system having a multiple word memory and an association input register capable of character-by-character shifting of data and association after each shift operation and having means for masking portions of the association input register.

Another object of this invention is to provide a data comparing system having a multiple word association input register and a shifting register capable of character-by-character shifting of data and capable of comparing the contents of the shifting register with the contents of the multiple word association input register after each character shift operation.

The foregoing and other objects, features and advantages of the invention will be apparent from the following more particular description of preferred embodiments of the invention, as illustrated in the accompanying drawings.

In the drawings:

FIGURE 1 shows the arrangement of FIGURES 1*a*, 1*b* and 1*c*.

FIGURES 1*a*, 1*b* and 1*c* together comprise a diagrammatic representation of an embodiment of this invention.

FIGURE 2*a* is a schematic representation of a cryogenic gate element.

FIGURE 2*b* is a simplified schematic representation of the gate element shown in FIGURE 2*a*.

FIGURE 3*a* is a schematic representation of a cryogenic gate circuit.

FIGURE 3*b* is a block representation of the circuit shown in FIGURE 3*a*.

FIGURE 3*c* is a schematic representation of another gate circuit.

FIGURE 3*d* is a block representation of the circuit shown in FIGURE 3*c*.

FIGURE 4 is a schematic representation of a cryogenic flip-flop.

FIGURE 5*a* is a schematic representation of a six-bit character memory cell.

FIGURE 5*b* is a block representation of the circuit of FIGURE 5*a*.

FIGURE 6*a* is a schematic representation of a data transfer circuit.

FIGURE 6*b* is a block representation of the circuit of FIGURE 6*a*.

FIGURE 7*a* is a schematic representation of another memory cell.

FIGURE 7*b* is a block representation of the circuit of FIGURE 7*a*.

FIGURE 8*a* is a schematic representation of an association input register cell.

FIGURE 8*b* is a block representation of the circuit of FIGURE 8*a*.

FIGURE 9*a* is a schematic representation of another association input register cell.

FIGURE 9*b* is a block representation of the circuit of FIGURE 9*a*.

FIGURE 10 shows the arrangement of FIGURES 10*a* and 10*b*.

FIGURES 10*a* and 10*b* taken together are a schematic representation of a control circuit.

*General description*

Figure 1A:
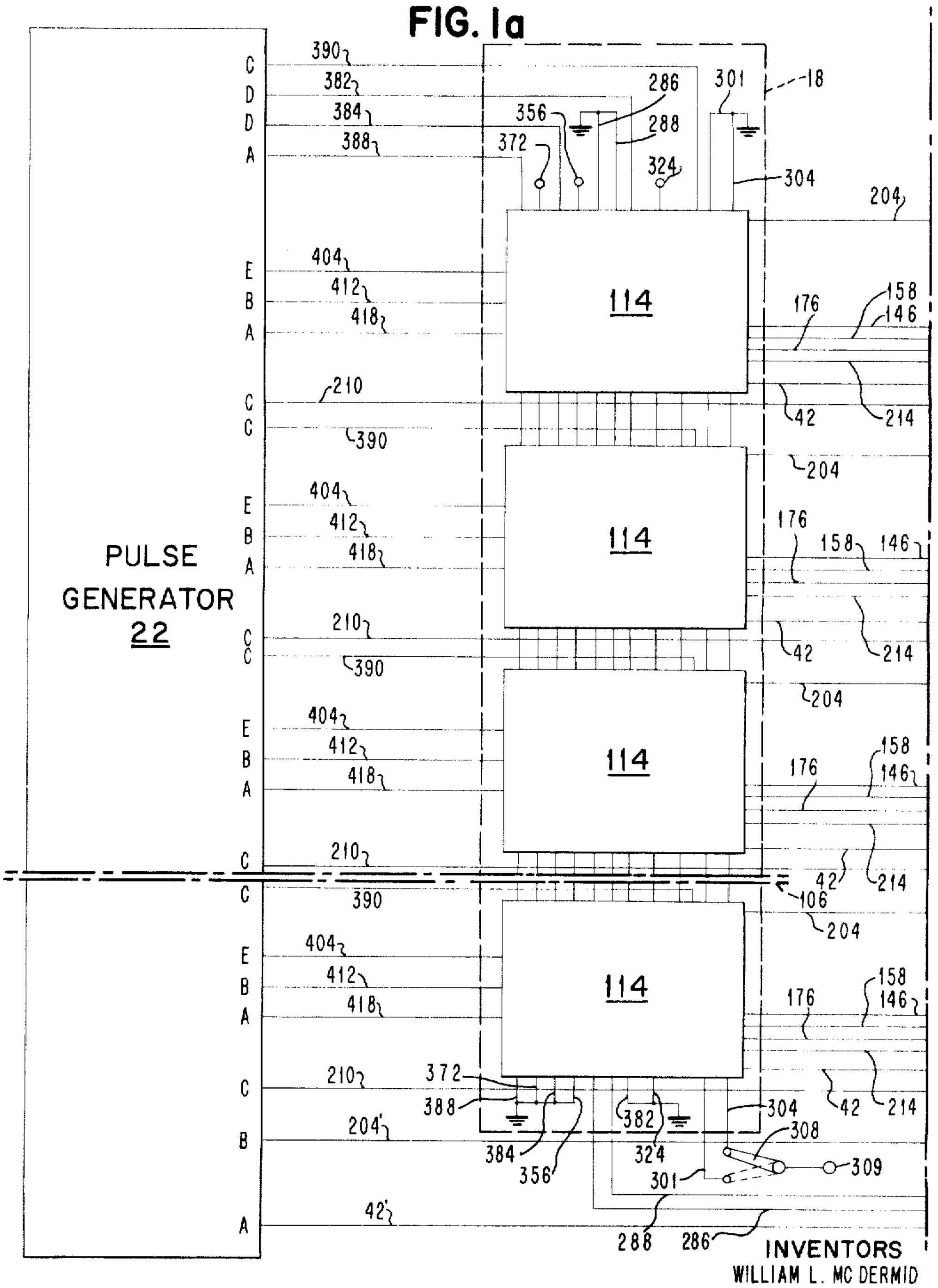
Figure 1:
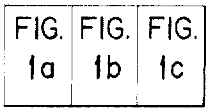
Figure 1B:
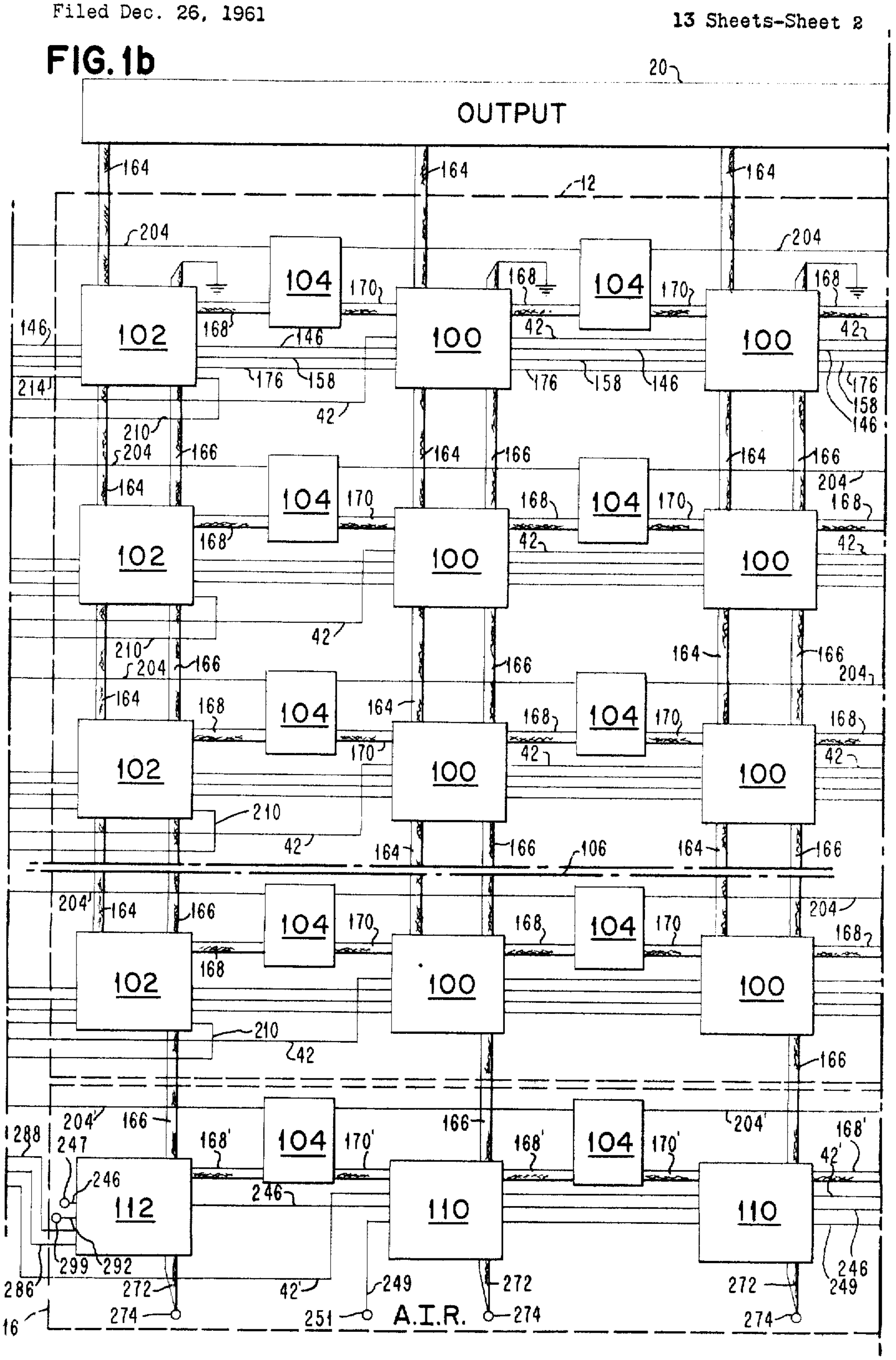
Figure 1C:
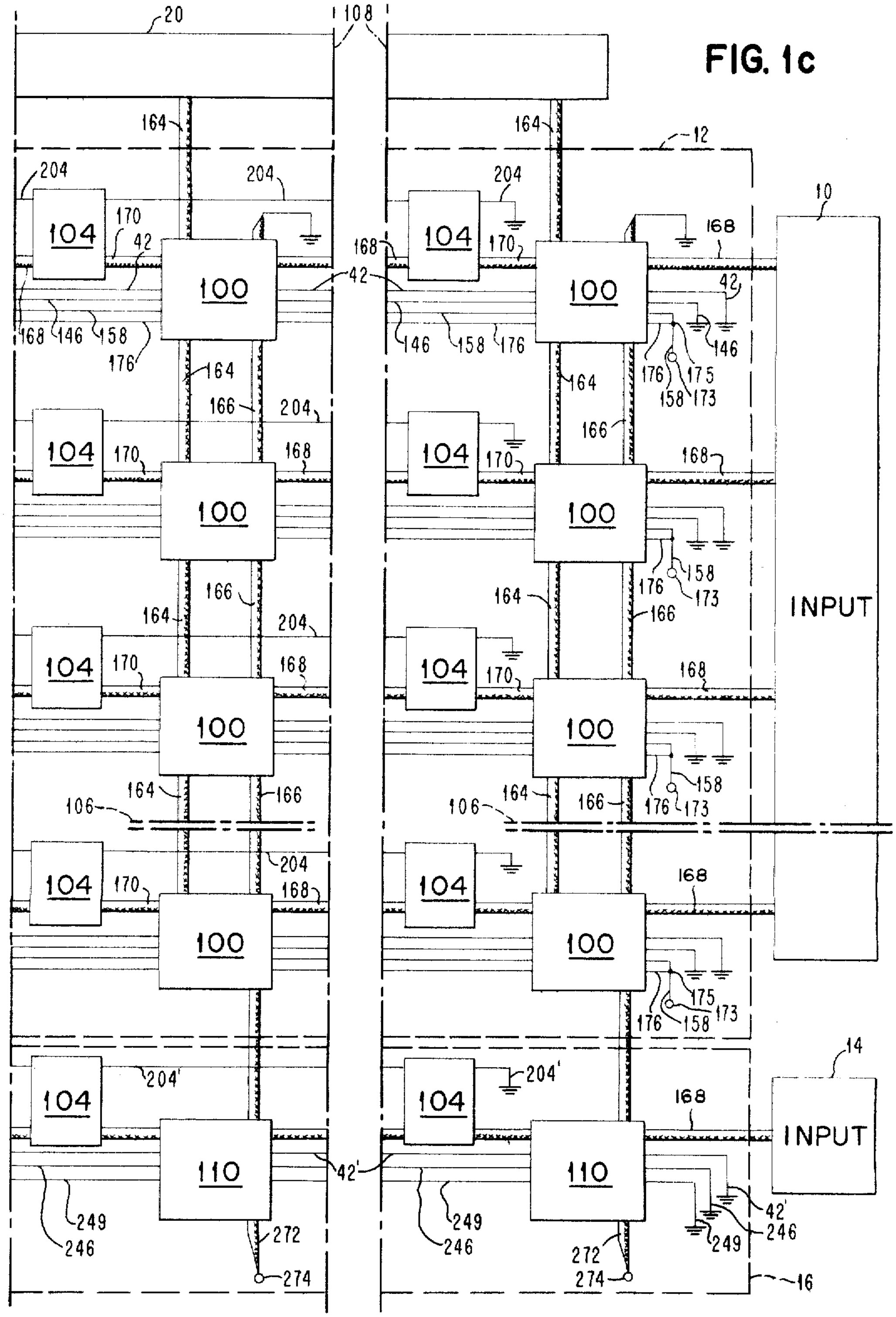

Referring to FIGURES 1*a*, 1*b* and 1*c*, data are shifted character-by-character from an input unit 10 into a memory unit 12, and from an input unit 14 into an association input register (AIR) unit 16. A unit 18 controls shifting, association and read out of data to an output unit 20.

The system is operated by repetitive sequences of pulses designated A, B, C, D and E which are provided by a pulse generator unit 22. These sequences of pulses control the shifting of data in the memory and in the AIR, the association of data in the AIR and memory, and the reading out of matching words from memory. In general, the A and B pulses control shifting of data, A pulses also reset readout circuits; C pulses test for a match condition; D pulses control read out of matching words and also reset mismatch circuits; E pulses reset shift circuits. The system has the capability of associating after each character shift operation, however, this capability is modified by the requirement that association or comparison with a particular memory word cannot be accomplished unless a START (ST) character stands in the left-most character position of that word of memory. Furthermore, the association with all words is inhibited unless a START (ST) character is in the left-most character position of the AIR.

Data may be shifted in one memory word while shifting in other memory words is inhibited if those other words have data already shifted fully therein with an ST character standing in the left-most character position. Data may also be shifted into one or more memory words while other memory words are totally empty. Also, matching data may be read out of one memory word while data are being shifted into other memory words.

Where more than one memory word matches the contents of the AIR during a given association cycle, a number of sequence of A, B, C, D and E pulses equal to the number of matching words is required to read out all matching words, since the read out, while parallel-by-bit, is serial-by-word.

The source of data for the AIR may be a repetitive source such as an endless tape. In this way, if a particular association word passed through the AIR 16 at a time when a corresponding word is not in any of the memory words, this word subsequently inserted into memory will be compared, at a later time, with the same association word when it again passes through the AIR.

Since the invention lies primarily in the shifting and association features, only these features will be described in detail even though described generally in the environment of a larger, more complex system. For example, the invention is described as part of an airlines reservation system.

Figure 2A:
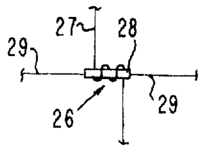
Figure 2B:
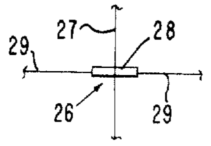

Referring to FIGURE 2*a*, a cryotron 26 is illustrated as having a control winding 27 disposed about the cryotron gate element 28 connected in a line 29. While this cryotron is represented as a conventional wire wound cryotron it is to be understood that other types of cryotrons may be used. The schematic representation of cryotron 26 in FIGURE 2*a* is depicted in FIGURE 2*b* in a simplified form. The reference numerals employed in FIGURE 2*a* are used in FIGURE 2*b* to designate corresponding parts. The simplified showing of FIGURE 2*b* is employed in subsequent circuit schematics to represent a cryotron such as is schematically illustrated in FIGURE 2*a*.

The circuits of the illustrated embodiment are operated at low temperatures such as by immersion in liquid helium. Current in the control winding 27 is employed to create a magnetic field which exceeds the critical field of the cryotron gate 28 to drive the gate resistive. When no current flows in the control winding 27, the gate element is superconductive and current may flow in the line 29.

Figure 3A:
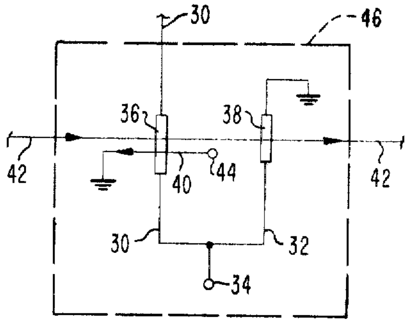

Referring to FIGURE 3*a*, a cryogenic circuit is schematically illustrated. A pair of lines 30 and 32 are common connected to a terminal 34 which is connected to a constant current source. A first cryogenic gate element 36 is connected in the line 30 and a second gate element 38 is connected in the line 32. The line 32 is connected to ground. Gate element 36 has a first control winding 40 and a second control winding 42. The line 42 also forms a control winding for gate element 38.

A current source for winding 40 is schematically illustrated by terminal 44, and provides a bias current in the direction of the arrowhead to hold gate element 36 normally resistive whereby current from source 34 is diverted through normally superconductive gate element 38. Winding 42 arranged closely adjacent to winding 40 links gate element 36 in the direction of the arrowhead oppositely to the linkage of winding 40. Thus, the magnetic field created by winding 42 opposes and cancels out the magnetic field created by winding 40 and the gate element 36 assumes a superconductive state. The current in line 42 renders gate element 38 resistive and current from the source 34 flows through gate element 36 and line 30.

When the current pulse on line 42 is terminated, element 36 is driven resistive by the current in line 40, element 38 goes superconductive and current from source 34 is again diverted to ground. Thus it is shown that a current pulse applied to line 42 results in a pulse of the same general duration on line 30.

Figure 3B:
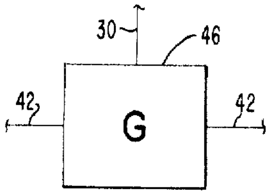

The circuit of FIGURE 3*a* is generally designated 46. Referring to FIGURE 3*b*, the circuit of FIGURE 3*a* is shown schematically as a box designated 46 having a control winding 42 entering and exiting and an output line 30. The box also is labelled G for gate. The representation of FIGURE 3*b* is used in subsequent figures to represent the circuit of FIGURE 3*a*.

Figure 4:
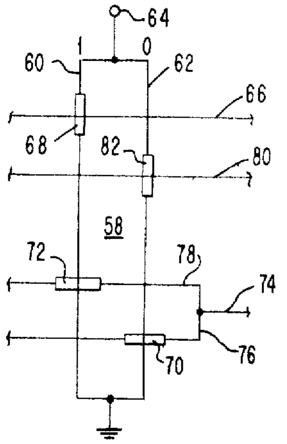

Referring to FIGURE 4, a cryogenic flip-flop 58 is schematically illustrated. A pair of parallel connected lines 60 and 62 are connected at one end to a current source represented by a terminal 64 and at the other end to ground. Since current is constantly applied to the terminal 64, current will flow in either the right-hand leg or the left-hand leg at all times. Current in the right-hand leg is arbitrarily designated as the 0 state of the flip-flop whereas current in the left-hand leg is designated the 1 state. Passage of a current through a 0 designated wire 66, which is the control winding of a gate element 68, renders this gate element resistive thereby diverting current to the right-hand leg and setting the flip-flop to the 0 state. In this state, a gate element 70 is resistive whereas a gate element 72 is superconductive. Therefore, a current applied to a line 74 is blocked by the gate element 70 from flowing through a line 76 and therefore flows via a parallel line 78 through the gate element 72. With the flip-flop 58 in the 0 state, the application of a 1 designated signal to a line 80 renders resistive a gate element 82, thereby diverting the current to the left-hand leg to set the flip-flop to its 1 state. In the 1 state, the gate element 72 is resistive whereby current applied to the line 74 flows through the gate element 70. While additionad gate elements may be inserted in the circuit, the foregoing description should suffice to explain the general operation of the type of flip-flops which constitute the present circuit.

An article by D. A. Buck entitled, "The Cryotron—A Superconductive Computer Element," which appears in the April 1956 issue of the Proceedings of the IRE on pages 482–493, includes a summary of both the theory of superconductivity and the history of its development, and cites a number of informative publications on the subject.

Referring again to FIGURES 1*a*, 1*b* and 1*c*, the memory unit 12 consists essentially of circuit blocks 100, 102 and 104. Each memory word consists of a plurality of circuit blocks 100 interconnected in part by circuit blocks 104, and a single, left-hand circuit block 102 connected to the preceding block 100 in part by a circuit block 104. The memory is shown as consisting of four horizontal memory words, however, the break line 106 is intended to indicate that the memory may consist of a greater number of memory words. Similarly, the vertical break line 108 in FIGURE 1*c* is intended to indicate that the memory words may be of a greater length, i.e., may include additional sets of blocks 100 and 104. In fact, the data shown in FIGURE 12*a* and used in an example of the system operation requires more than the illustrated number of blocks 100 in each word. It will be understood that the additional blocks 100 and 104 would be interposed at the break line 108.

Figures 5A, 5B:
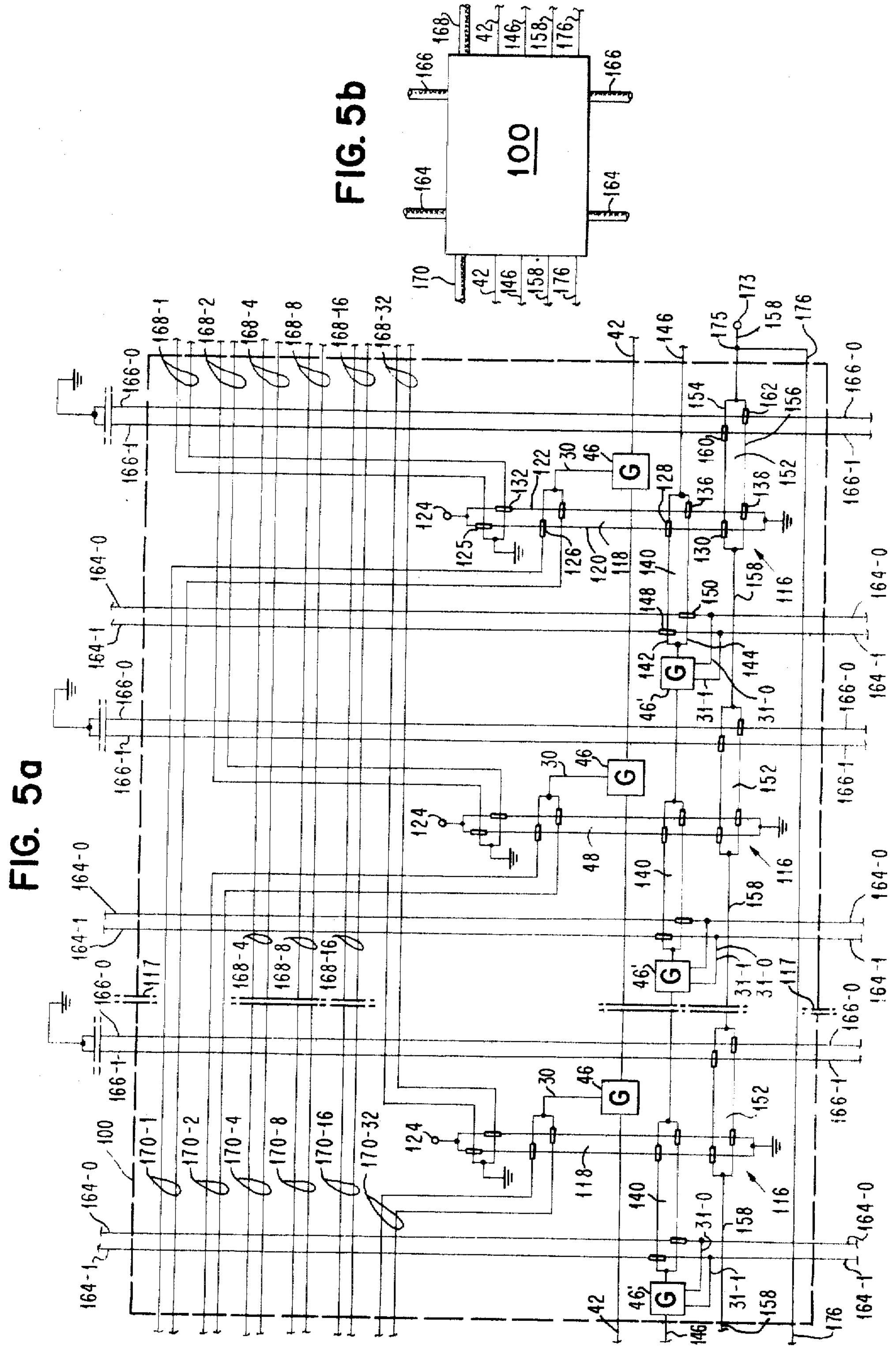
Figure 6A:
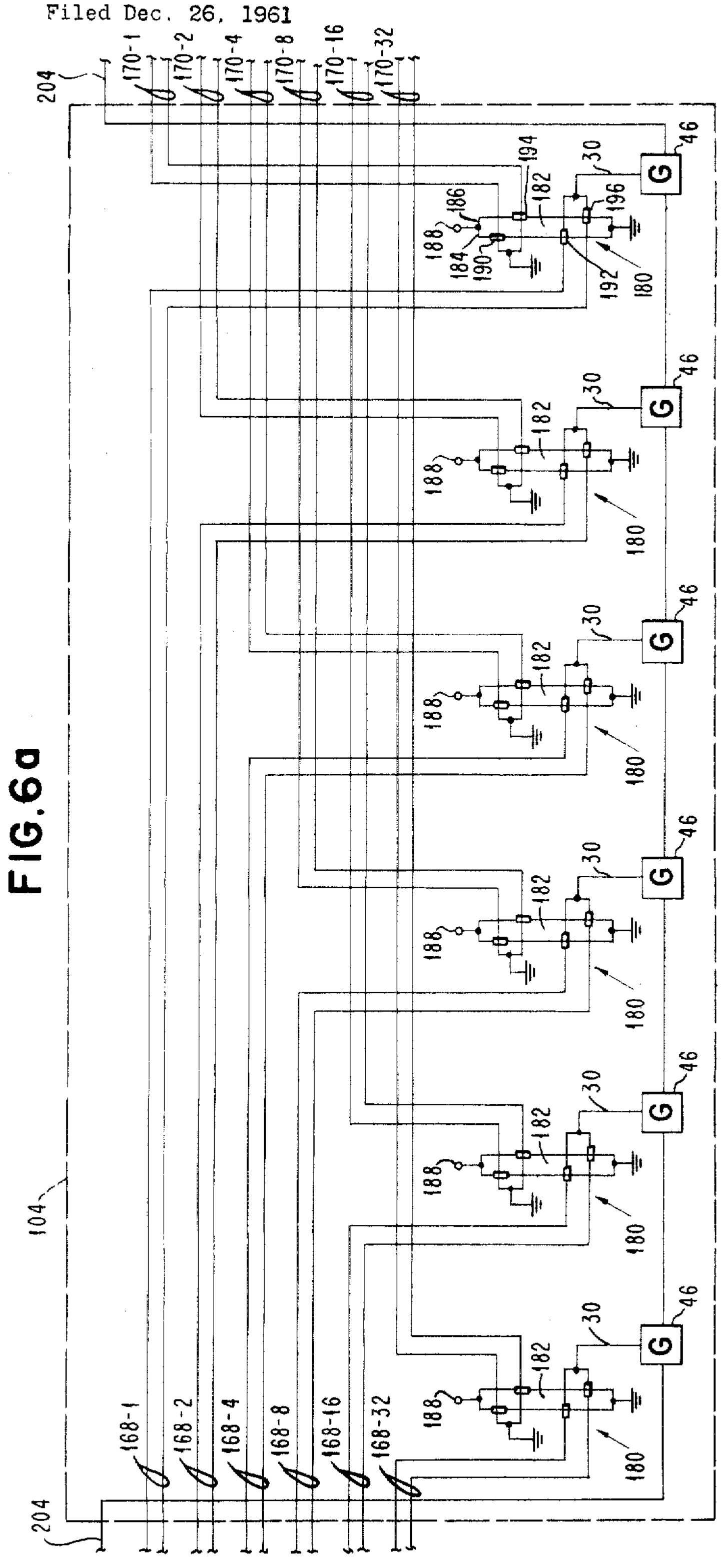
Figure 6B:
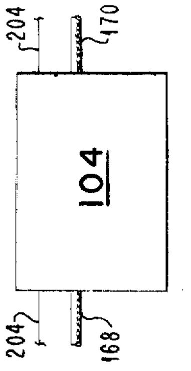
Figure 7B:
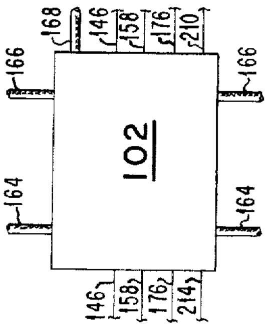
Figure 7A:
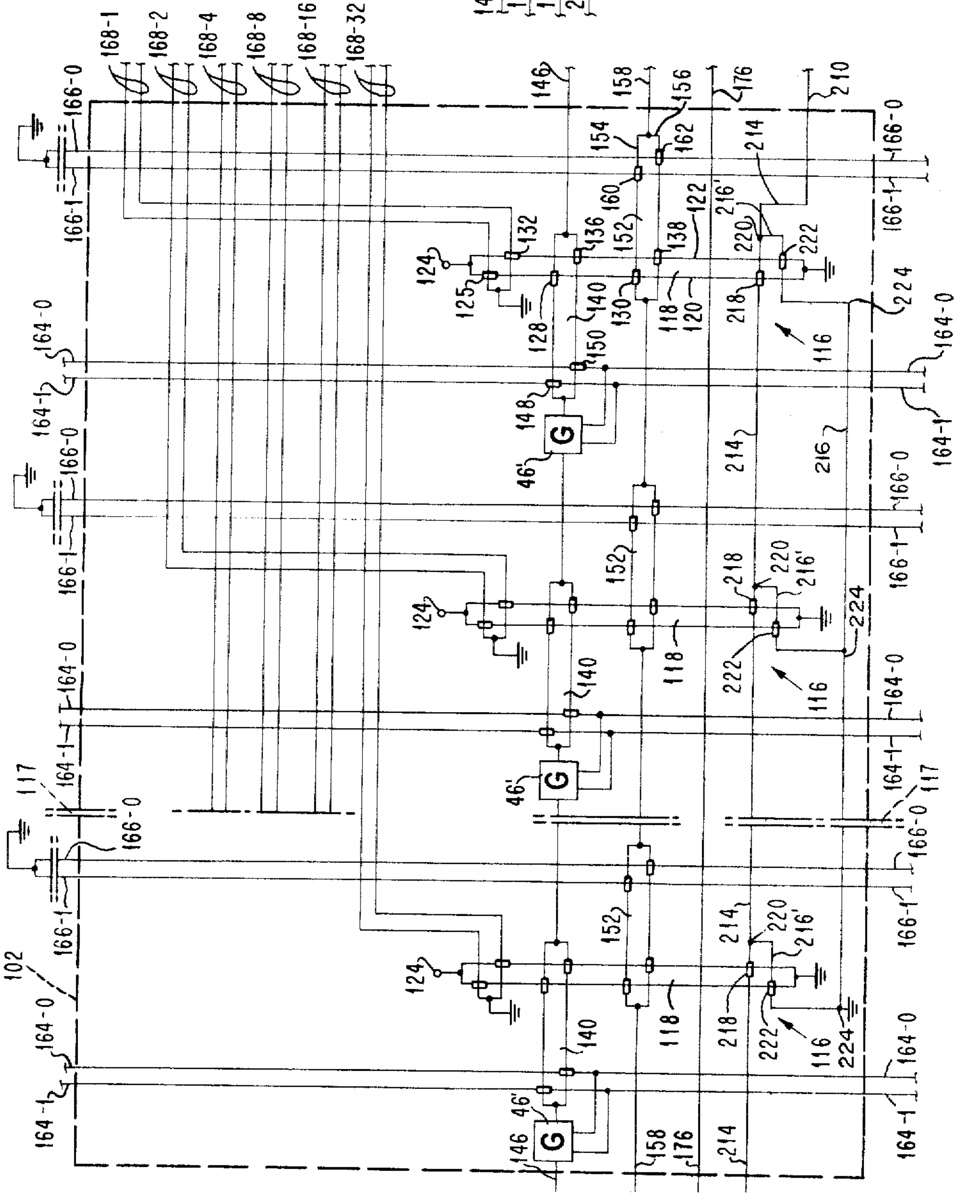

In order to avoid an unnecessarily large number of drawings illustrating the details of a system, a single one of each of the blocks 100, 102 and 104 is shown in FIGURES 5*a*, 7*a* and 6*a* respectively, and described in detail. Thereafter reference is made to the block representations shown in FIGURES 5*b*, 7*b* and 6*b*, respectively.

Figures 8A, 8B:
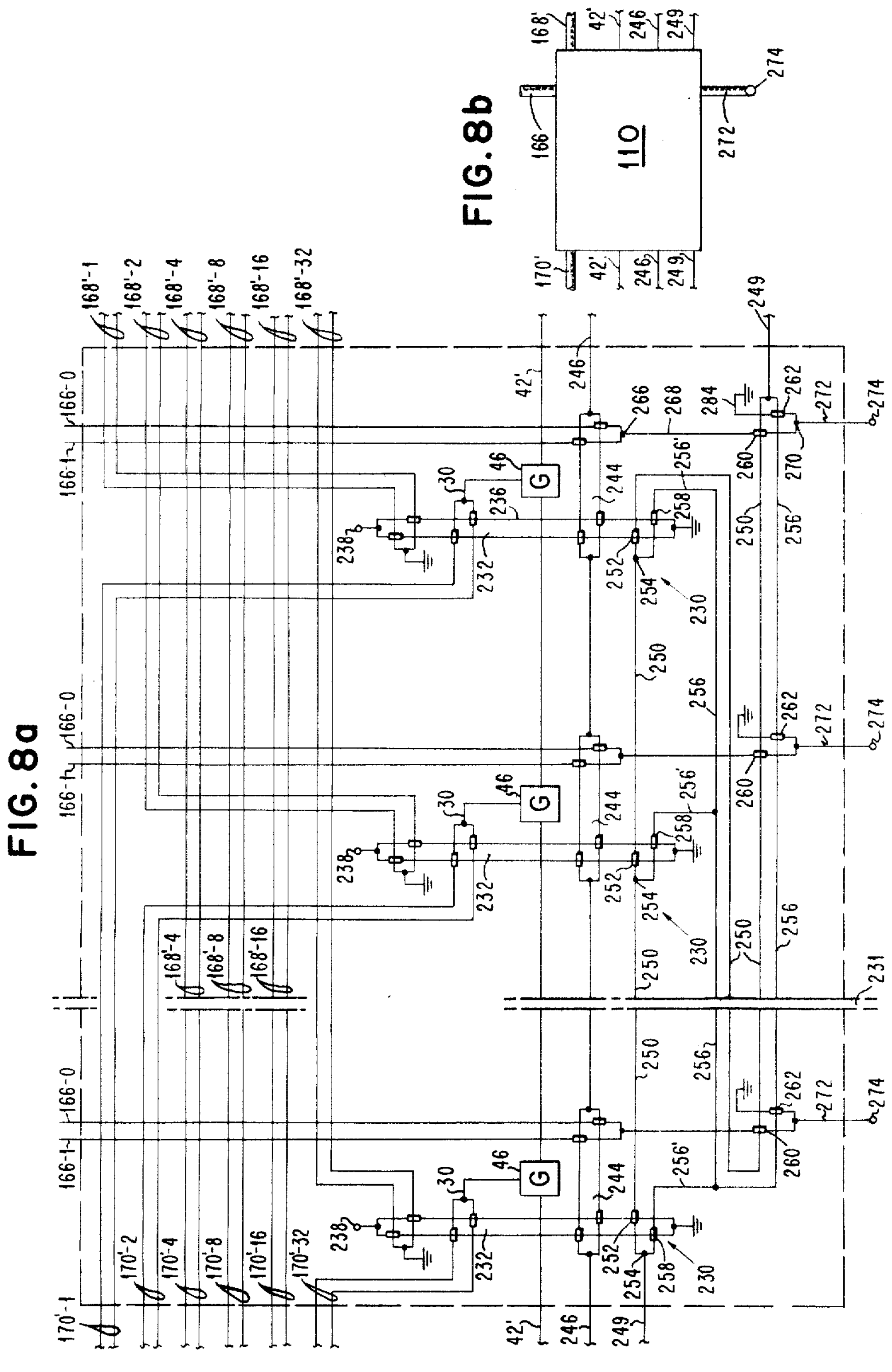
Figures 9A, 9B:
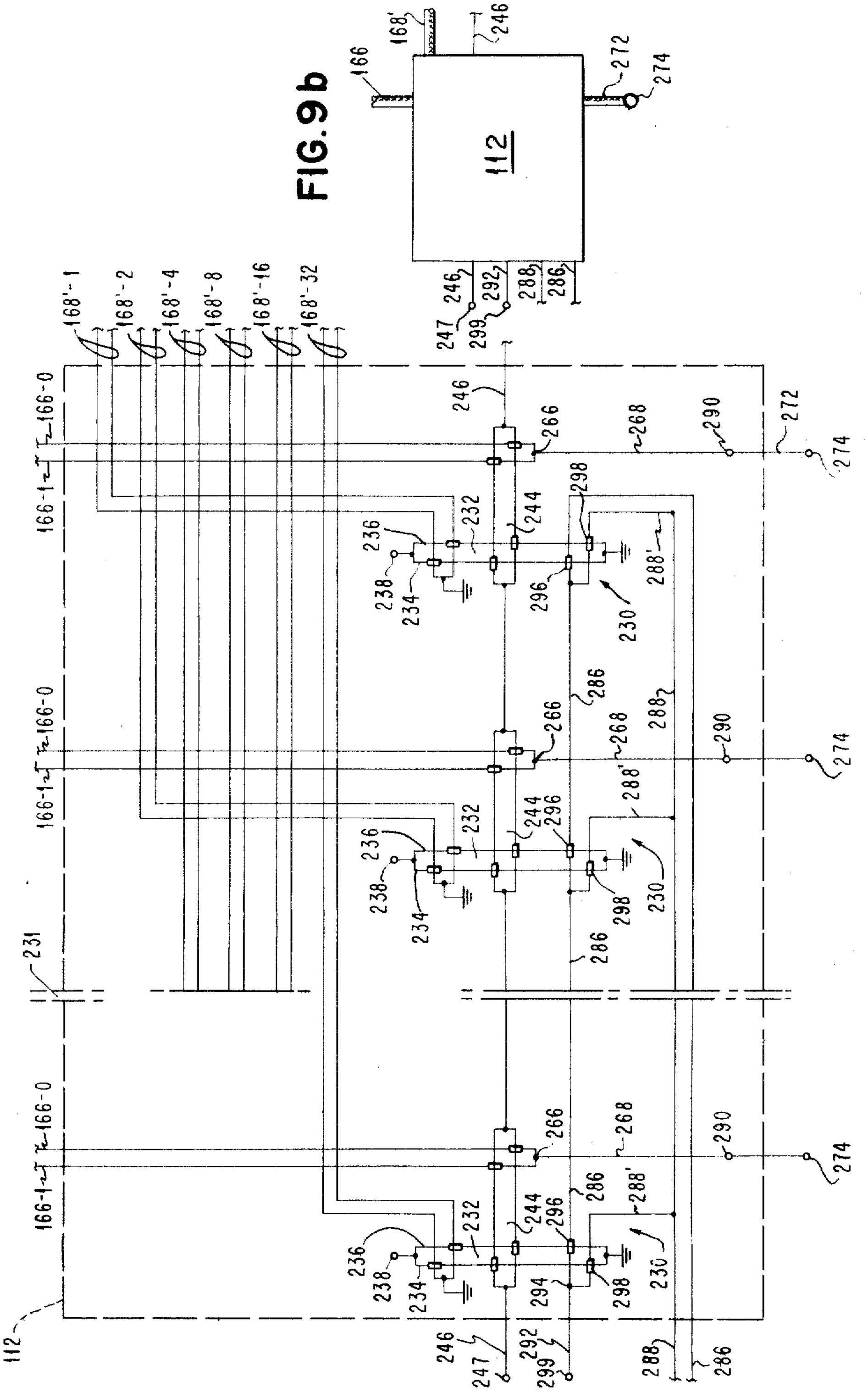

Similarly, the associative input register (AIR) 16 consists of a plurality of circuit blocks designated 110 and a single, left-hand circuit block designated 112. The blocks 110 and the blocks 112 are interconnected in part by circuit blocks 104 which are identical to trose in the memory 12. Again a single one of the blocks 110 is shown in FIGURE 8*a* and described in detail. Also the single block 112 is shown in FIGURE 9*a* and described in detail. Block representations are shown in FIGURES 8*b* and 9*b*.

The control circuit 18 includes a circuit block 114 for each memory word. A group of three circuit blocks 114 is shown in FIGURES 10*a* and 10*b* and described in detail. The circuit of FIGURES 10*a* and 10*b* is shown in a simplified form in FIGURE 1*a*.

*Circuit 100*

Referring to FIGURE 5*a*, the circuit block 100 is shown. This block includes six cryogenic flip-flops 116. Only the two right-hand flip-flops and the left-hand one are shown, but the three omitted at the break line 117 are identical. Referring particularly to the right-hand flip-flop, each flip-flop includes a circuit loop 118 consisting of a pair of wires 120 and 122 connected in parallel between ground and a terminal 124 which schematically represents a constant current source. The line 120 includes a cryogenic gate element 125 and forms the control windings for cryogenic gate elements 126, 128, and 130. The line 122 includes a gate element 132 and forms the control windings for gate elements 134, 136 and 138.

Figure 3C:
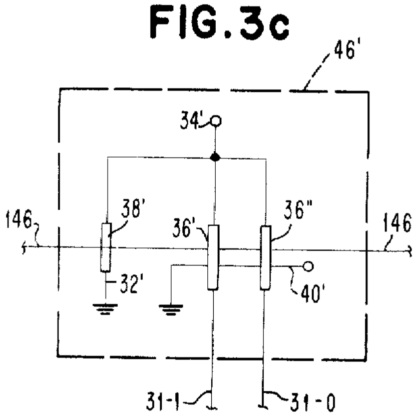
Figure 3D:
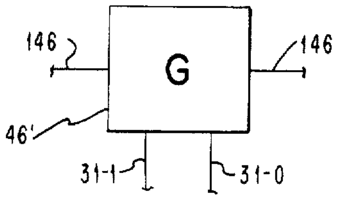

A read out circuit loop 140 consists of a pair of parallel connected lines 142 and 144. The read out loops 140 of all six flip-flops 116 are series connected in a line 146 which also includes six gate circuits 46′. Referring to FIGURE 3*c*, a gate circuit 46′ is shown. This circuit is somewhat similar to the circuit 46 shown in FIGURE 3*a*. Three lines 31–1, 31–0 and 32′ are common connected to a terminal 34′ which is connected to a constant current source. Gate elements 36′ and 36″ are included in the respective lines 31–1 and 31–0. A gate element 38′ is included in the line 32′ which is connected to ground. Gate elements 36′ and 36″ each have a control winding formed by a line 40′. A line 146 forms control windings for gate elements 36′, 36″ and 38′. The current constantly applied to the line 40′ in the direction of the arrowhead biases the gate elements 36′ and 36″ to their resistive states. When current is applied to the line 146 in the direction of the arrowhead, the elements 36′ and 36″ go superconductive whereas the element 32′ goes resistive. Current then flows in the line 31–1 or 31–0 depending upon which one is blocked by a resistive element in another part of the circuit. A block representation of the circuit of FIGURE 3*c* is shown in FIGURE 3*d* and is used in the block diagram of FIGURES 5*a* and 7*a*.

Referring again to FIGURE 5*a*, the line 142 includes the gate element 128 and forms the control winding for a gate element 148. The line 144 includes the gate element 136 and forms the control winding for a gate element 150.

An association loop 152 consists of a pair of lines 154 and 156 connected in parallel. The loops 152 of all six flip-flops 116 are series connected in a line 158. The line 154 includes the gate element 130 and a gate element 160. The line 156 includes the gate element 138 and a gate element 162.

A pair of lines designated 164–1 and 164–0 is associated with each flip-flop 116. Lines 164–1 and 164–0 include the gate elements 148 and 150 respectively. The lines 31–1 and 31–0 of a gate circuit 46′ connect to lines 164–1 and 164–0.

A pair of lines 166–1 and 166–0 is associated with each flip-flop 116. Lines 166–1 and 166–0 form the control windings for the gate elements 160 and 162 respectively.

Six pairs of input lines designated 168–1, 168–2, 168–4, 168–8, 168–16 and 168–32 respectively, in accordance with a binary code, enter the circuit 100 from the right. Each pair of lines extends to a different flip-flop 116. The upper line of each pair is designated 0 and forms the control winding for a corresponding gate element 125. The lower line of each pair is designated 1 and forms the control winding for a corresponding gate element 132. The lines of each pair are common connected to ground.

Six pairs of output lines designated 170–1, 170–2, 170–4, 170–8, 170–16 and 170–32 respectively emerge from the circuit 100 at the left. The upper line of each pair is designated 0 and the lower line is designated 1. The upper, 0-designated line of each pair includes the gate element 126 of a corresponding flip-flop 116 whereas the lower, 1-designated line includes the gate element 134. The lines of each pair are common connected to a gate circuit 46 of the type shown and described with reference to FIGURES 3*a* and 3*b*, via a line 30. As shown in FIGURE 3*b*, a line 42 enters the gate circuit 46 on the left and emerges on the right. Successive circuits 46 are series connected by the line 42.

The operation of the circuit 100 is as follows, a six-bit binary coded character is entered, parallel-by-bit, into the six flip-flops 116 via the lines 168. Current is constantly applied at each terminal 124 and flows through the lines 120 and 122 to ground. The input character consists of a current on one or the other of each pair of lines 168. If current is applied to a particular 0-designated line 168, the corresponding gate element 125 is rendered resistive and the current flows through the right-hand leg 122 of the loop 118 to indicate the storage of a binary 0. If the current is applied to the 1-designated line 168, the corresponding gate element 132 is rendered resistive causing the current to flow in the left-hand leg 120 to indicate the storage of a binary 1.

Association loops 152 operate as follows: each flip-flop 116 stands in either the 1 state or the 0 state and current flows on one of the lines 166–0 or 166–1 in accordance with the contents of a corresponding portion of the AIR 16. Assume that a particular flip-flop 116 contains a binary 1, that is, current is flowing in the left-hand leg whereby the gate element 130 is resistive and the gate element 138 is superconductive. Assume that current flows in the line 166–1. It is thus seen that the binary 1 on line 166–1 corresponds to the binary 1 in the flip-flop 116. Current is supplied continuously to the line 158 from a current source represented by a terminal 173. It is noted that the gate elements 160 and 130 in the line 154 are both resistive whereas the gate elements 138 and 162 in the line 156 are both superconductive. Therefore, the current on line 158 flows through the line 156 indicating that there is a match condition between the contents of the flip-flop 116 and the data applied to the pair of lines 166–1 and 166–0. If current had been on the line 166–0, the gate element 162 would have been resistive. The gate element 130 is resistive due to the 1-state of flip-flop 116. Therefore, current on the line 158 can flow through neither the line 154 or 156 and is diverted via a terminal 175 to a line 176.

Thus, current emerging on the line 158 at the left end of the circuit 100 indicates a match condition between the contents of all six flip-flops 116 in that circuit 100 and the data represented by currents in the six pairs of lines 166–1 and 166–0. Current on the line 176 indicates that there is a mismatch in at least one of the flip-flops 116. It will be understood that the only terminal 175 in a memory word is located to the right of the right-most block 100 (see FIGURE 1*c*) and the line 176 in each successive block 100 and block 102 runs parallel to corresponding lines 158 without further connection thereto.

During readout, the contents of each flip-flop 116 is manifested by a current on one of the lines 164–0 or 164–1. When current is applied to the readout line 146, the gate elements 46′ are rendered superconductive to pass current to a line 31–0 or 31–1 depending upon the binary state of the associated flip-flops 116. For example, assume that a binary 1 is stored in a flip-flop 116 whereby current flows in the left-hand leg 120 and the gate element 128 is resistive whereas the gate element 136 is superconductive. Current applied to the line 146 will flow through the line 144 since the gate element 136 is superconductive and the gate element 150 is thereby rendered resistive. Therefore, current is prevented from flowing in the line 31–0 and flows instead through the lines 31–1 and 164–1, and the superconductive gate element 148 to emerge at the top on the line 164–1, thus indicating the binary 1 contents of the flip-flop 116. If a binary 0 had been stored, the current would have flowed through the lines 31–0 and 164–0 to indicate a binary 0.

To read data non-destructively from a circuit 100 on lines 170, a current pulse is applied to the line 42 which actuates each of the gate circuits 46 resulting in a current pulse on each corresponding line 30. These current pulses flow in the 0-designated line or the 1-designated line of each pair of lines 170 in accordance with the 0 or 1 contents of the associated flip-flops 116. For example, if a flip-flop 116 stores a binary 1, the gate element 126 is resistive and the gate element 134 is superconductive. Therefore, current on the line 30 flows through the corresponding 1-designated (lower) line 170. Conversely if a binary 0 is stored in the flip-flop 116, the gate element 134 is resistive and the current pulse on the line 30 flows in the 0-designated (upper) line 170. The data in the flip-flops 116 remains until changed by the shifting in of new data via lines 168.

The circuit of FIGURE 5*a* is schematically represented by the block diagram shown in FIGURE 5*b* and labelled 100. The pairs of lines 164, 166, 168 and 170 are shown in FIGURE 5*b* in cable form. This block representation is used in FIGURES 1*a*, 1*b* and 1*c*. The circuit 100 may also be referred to as a main or primary storage circuit as distinguished from the circuit 104 which is an intermediate or secondary storage circuit.

It will be noted in FIGURES 1*b* and 1*c* that the lines 164 do not extend from the bottom of the lowermost circuit blocks 102 and 100 but rather shall be understood to originate in these lower blocks, for example, at the points where they are connected to the lines 31.

*Circuit 104*

Referring to FIGURE 6*a*, the circuit block 104 is shown. This circuit includes six flip-flops 180. Each flip-flop 180 includes a circuit loop 182 consisting of a pair of lines 184 and 186 connected in parallel between ground and a terminal 188 which schematically represents a constant current source. Each line 184 includes a cryogenic gate element 190 and forms the control winding for a gate element 192. Each line 186 includes a gate element 194 and forms the control winding for gate element 196.

Each flip-flop 180 is associated with a pair of input lines 170 which are the output lines 170 described in connection with circdit 100 shown in FIGURE 5*a*. Similarly, each flip-flop 180 is associated with a pair of output lines 168 which are the input lines 168 described in connection with the circuit 100. The upper line of each pair of lines 168 and 170 is designated 0 whereas the lower line of each pair is designated 1. Binary coded characters are entered into the circuit 104 by 0 and 1 representing current pulses on the pairs of lines 170. Data stored in a flip-flop 180 is non-destructively read out to a corresponding pair of lines 168 by application of a current to a line 204. The line 204 corresponds to the line 42 in FIGURES 3*a* and 5*a* but is given a different designation here to avoid confusion. A current pulse on line 204 effects the output of a current pulse on the lines 30 associated with the gate circuit 46. The data in the flip-flops 180 remains until changed by the introduction of new data via lines 170.

The circuit of FIGURE 6*a* is schematically represented by the block diagram shown in FIGURE 6*b* and labelled 104. This block representation is used in FIGURES 1*a*, 1*b*, and 1*c*. As described hereinbefore, the circuit 104 is an intermediate or secondary storage circuit.

*Circuit 102*

Referring to FIGURE 7*a*, the circuit block 102, except for two differences which are described hereinafter, is the same as the previously described circuit block 100 and operates in a similar manner. Accordingly, corresponding numbers are assigned to corresponding parts in FIGURE 7*a*. Only the two right-hand flip-flops and the left-hand one are shown but the three omitted at the break line 117 are identical to all flip-flops except the right-hand one which differs by the reversal of two gate elements.

The first difference is that circuit block 102 does not have output lines 170 since data is never shifted from a block 102 to a following block 104 as is done in the case of each block 100. Therefore, the block 102 does not require an input line 42 or the gate circuits 46.

The second difference which distinguishes circuit block 102 from circuit block 100 is the addition of an extra cryotron gate element in each of the lines 120 and 122 of each circuit loop 118. A line 210 enters the circuit block 102 at the lower right corner and subsequently forms lines 214 and 216. The line 216 is grounded at the lower left corner of circuit 102. The line 214 passes through each of the six flip-flops 116 linking a gate element 218 in each flip-flop. It is noted that the gate element 218 in the right-hand flip-flop 116 has for a control winding the left-hand line 120, whereas in the remaining five flip-flops 116, the gate element 218 has for its conrtol winding the right-hand line 122. This arrangement is in accordance with the binary coded START (ST) character (111110). Thus, with the ST character stored in the flip-flops of circuit 102, current is flowing in the left-hand lines 120 of the left-most five flip-flops 116 and in the right-hand line 122 of the right-hand flip-flop.

In the line 214, immediately to the right of each flip-flop 116, at terminals 220, a line 216′ branches from line 214. Each line 216′ includes a gate element 222 and is connected to the line 216 at a terminal 224. It is noted that the arrangement of the gate elements 222 is the complement of the gate elements 218, whereby the gate elements 222 of the left-most five flip-flops 116 have for their control windings the lines 120 whereas the right-hand gate element 222 has for its control winding the line 122.

It is thus apparent that, when the ST character is stored in the circuit 102 and a current pulse is applied to the line 210, this pulse emerges from the circuit 102 at the left on line 214. If any character other than the ST character is stored in the circuit 102, the current pulse applied to line 210 flows to ground through the line 216 and a line 216′.

The circuit of FIGURE 7*a* is schematically represented by the block diagram shown in FIGURE 7*b* and labelled 102. This block representation is used in FIGURES 1*a*, 1*b*, and 1*c*. The circuit 102 is a main or primary storage circuit.

*Circuit 110*

Referring to FIGURE 8*a*, the circuit block 110 is shown. This circuit is quite similar to circuit 100, and only the differences therefrom are described in detail. The block 110 includes six flip-flops 230. Only the two right-hand flip-flops and the left-hand one are shown, but the three omitted at the break line 231 are identical to the left-hand one. Each flip-flop 230 includes a circuit loop 232 consisting of parallel connected lines 234 and 236 connected between ground and a constant current source represented by a terminal 238.

Six pairs of input lines designated 168′–1, 168′–2, 168′–4, 168′–8, 168′–16 and 168′–32 and corresponding generally to the lines 168 in FIGURE *5a* enter the circuit 110 from the right for entry of data into the flip-flops 230. Six pairs of output lines 170′ corresponding generally to the lines 170 in FIGURE *5a* emerge from a circuit 110 at the left and are utilized for reading data non-destructively from a circuit 110 to a suceeding circuit 104 via lines 170′. These lines 170′ have associated therewith the previously described gate circuits 46. The input to the gate circuits 46 is via a line 42′ corresponding to the input lines 42 associated with circuit 100.

Each flip-flop 230 has associated therewith a readout circuit loop 244. This circuit loop 244 is similar to the circuit loop 140 in circuit 100. The six circuit loops 244 are connected in series in a line 246 entering the circuit 110 at one side and exiting at the other side and corresponding to the line 146 in FIGURE *5a*. To this point the circuit 110 is similar to the circuit 100. In circuit 110 the line 246 is connected (FIGURE *1b*) to a constant current source represented by a terminal 247 whereas, in circuit 100, pulses are applied to the line 146. The lines 166–0 and 166–1 described in connection with circuits 100 also pass through the readout circuit loops 244 of circuit 110.

Figure 12:
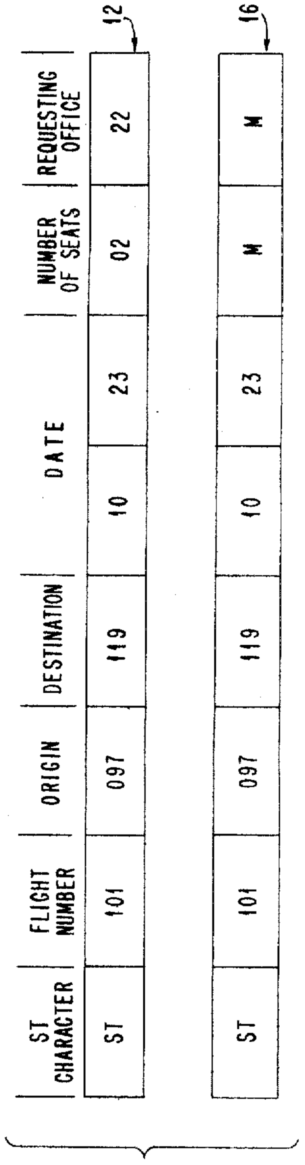
FIGURE 12 is a representation of memory word data and association input register data.

A line 249 enters the circuit 110 at the left and joins a line 250 which intersects the circuit loops 232 of each flip-flop 230. The line 249 is connected (FIGURE *1b*) to a constant current source represented by a terminal 251. The line 250 includes a gate element 252 in each flip-flop 230. In a manner similar to that described in connection with line 214 in FIGURE *7a*, the gate elements 252 are arranged in the flip-flops 230 in accordance with a binary coded mask character (111100). In FIGURE 12, the mask character is represented by the letter M. At a terminal 254 where the line 250 starts, the first of several lines 256′ branches off. Just to the left of the remaining loops 232, at terminals also designated 254, additional lines 256′ branch from the line 250. Each line 256′ passes through a gate element 258, in a corresponding flip-flop 230. The gate elements 258 are arranged complementary to the gate elements 252.

The individual lines 256′ connect to a line 256 which runs parallel to the line 250 after it passes through the flip-flops 230. It is thus seen that if the mask character (111100) stands in the flip-flops 230 of the circuit 110, current on the line 249 flows through the line 250. However, if any character other than the mask character stands in the flip-flops, the current on line 249 is diverted at the point of mismatch through a line 256′ to the line 256.

After passing through the flip-flops 230, in line 250 forms the control windings for six gate elements 260, one associated with each flip-flop 230. Similarly, the line 256 forms the control windings for six gate elements 262, one for each flip-flop 230.

The lines 250 and 256 are again common connected to a line designated 249 emerging from the lower right corner of circuit 110. It is noted that this line 249 has the same designation as the input line 249 on the left. The same designation is given since the output line of one circuit 110 is the input line to a succeeding circuit 110.

The lines 166–0 and 166–1 of each pair of lines intersecting an association loop 244 of a flip-flop 230, are common connected at a point 266 to a line 268. This line 268 includes the gate element 260 and is connected at a point 270 to a line 272. The line 272 is connected to a constant current source represented by a terminal 274. The line 272 branches at the terminal 270 to a line 284 which, after passing through the gate element 262 is connected to ground.

If the character standing in the flip-flops 230 of the circuit 110 is the mask character M, current flow through the line 250 and renders the gate elements 260 resistive whereby current on the lines 272 is diverted through the gate elements 262 to ground. However, if a character other than a mask character M stands in the flip-flops 230, the current on line 249 flows in the line 256 and renders the gate elements 262 resistive whereby current applied to the lines 272 flows through the lines 268 to the terminals 266.

At the terminals 266 the currents are diverted to either the lines 166–0 or 166–1 depending on the binary state of each individual flip-flop 230. It is thus seen that if a mask character stands in the circuit 110, current on the lines 272 flows to ground and does not reach the lines 166–0 and 166–1. If a character other than the mask character M stands in the flip-flops 230, the current on each line 272 flows through a corresponding line 166–0 or 166–1.

The circuit of FIGURE *8a* is schematically represented by the block diagram shown in FIGURE *8b* and labelled 110. This block representation is used in FIGURES *1a*, *1b* and *1c*. The circuit 110 is a main or primary storage circuit. The lines 166 and 272 are shown in cable form.

*Circuit 112*

Referring to FIGURE *9a*, the circuit block 112 is, in many respects, the same as the circuit block 110 in FIGURE *8a* and corresponding reference numbers are used. For example, the circuit 112 includes six flip-flops 230 which are, in most respects, the same as the flip-flops 230 in FIGURE *8a*. Only the two right-hand flip-flops and the left-hand one are shown but the three omitted at the break line 231 are identical to the left-hand one.

Each flip-flop 230 includes a circuit loop 232 consisting of parallel connected lines 234 and 236 connected between ground and a constant current source terminal 238. Six pairs of input lines 168′ are provided for entering data into the six flip-flops 230 in the manner described in connection with FIGURE *8a*. The circuit 112 does not have the corresponding output lines 170′ since data is not shifted out of circuit 112 to a following circuit.

Similarly, six pairs of lines 166–0 and 166–1 are provided intersecting the association loops 244. The lines 166–0 and 166–1 of each pair are common connected by terminals 266 to lines 268. The circuit 112 does not include the mask character testing circuit of FIGURE *8a* comprising lines 250 and 256 and the gate elements 260 and 262. However, in order to provide a parallel description of circuits 110 and 112 and to permit use of common line designations, a terminal 290 is provided in each line 268 connecting the lines 268 to corresponding lines 272 which are shown also in FIGURE *8a*. As in the circuit 110, each line 272 is connected to a constant current source represented by a terminal 274.

A line 292 entering the circuit 112 at the left branches at a terminal 294 into lines 286 and 288′. The line 286 passes through six flip-flops 230 and includes a gate element 296 in each of the circuit loops 232. The gate elements 296 are arranged in the flip-flops 230 in accordance with the binary coded ST character (111110).

In the opposite legs of the circuit loops 232, gate elements 298 are arranged complementary to the gate elements 296. Just to the left of each flip-flop 230, after the left-hand one, the line 286 branches at terminals also designated 294, into additional lines 288′. Current is constantly applied to the line 292 via a source represented by a terminal 299 (see also FIGURE *1b*), and flows through the six flip-flops 230 on the line 286, provided that the ST character stands in the flip-flops 230 of the circuit 112. If any other character stands in these flip-flops, the current on line 292 flows through one on the lines 288′, at the first point of difference between the ST character and the character in the circuit, to a line 288. The lines 286 and 288 emerge from the left side of the circuit 112 for a purpose described hereinafter in connection with FIGURES *10a*, *10b* and *1a*.

The circuit of FIGURE *9a* is schematically represented by the block diagram shown in FIGURE 9*b* and labelled 112. This block representation is used in FIGURE 1*b*. The lines 272 and 166 are shown in cable form. The circuit 112 is a main or primary storage circuit.

*Circuit 18*

Figure 10:
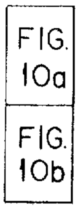
Figure 10A:
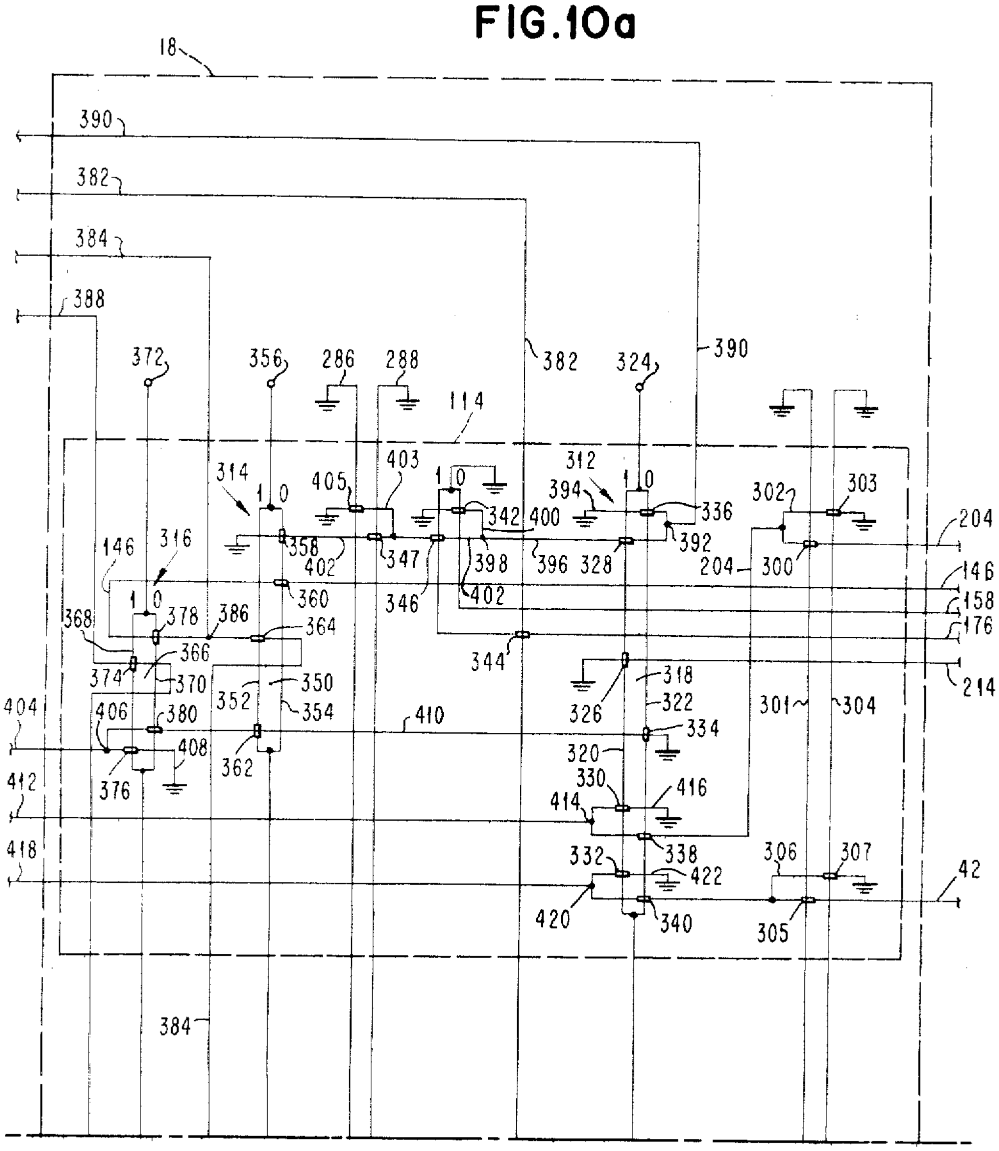
Figure 10B:
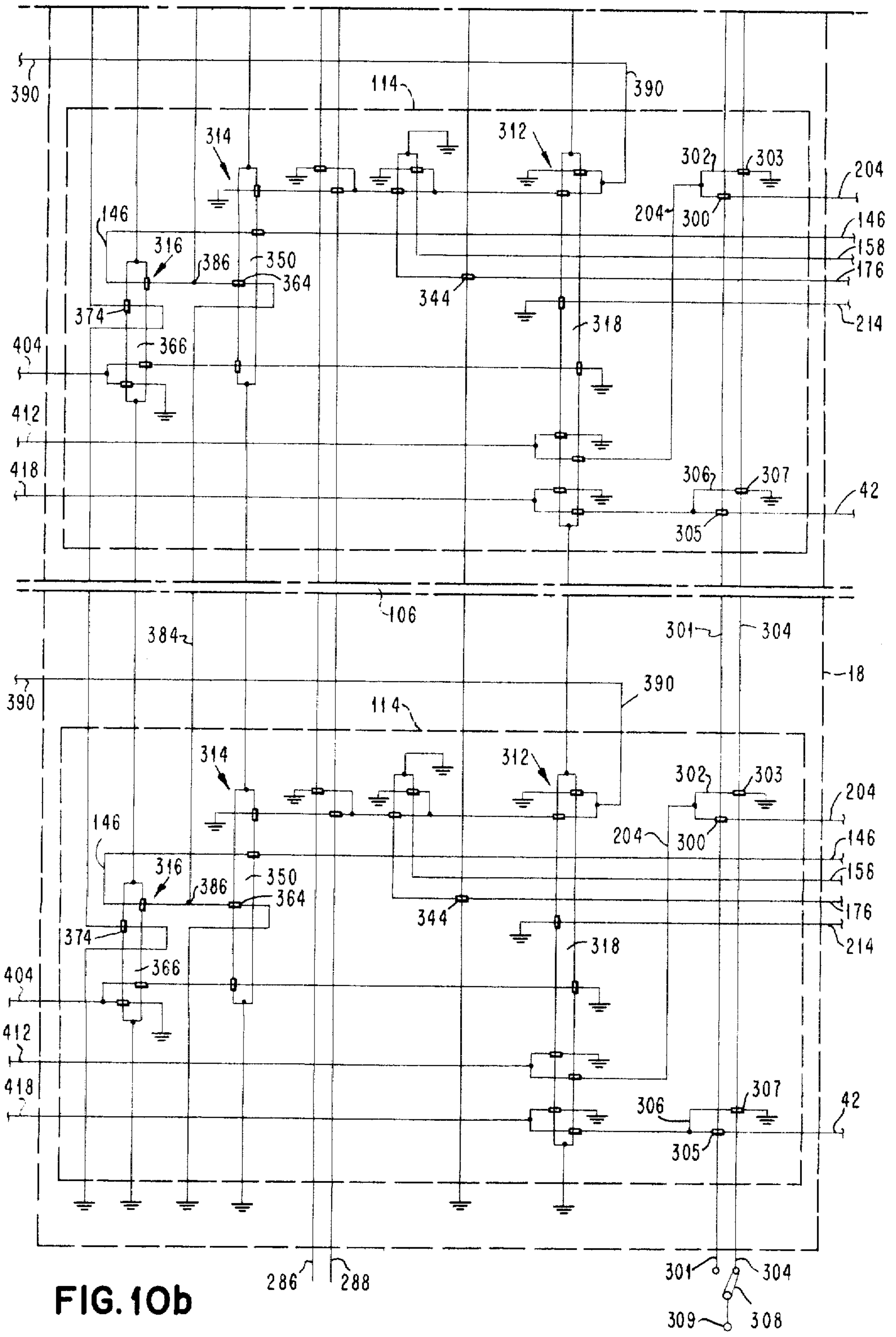

FIGURE 10 shows the arrangement of FIGURES 10*a* and 10*b* to form a circuit schematic of the control block 18. Referring to FIGURES 10*a* and 10*b*, the upper two circuit blocks 114 are shown as well as the lower block 114. The line 106 indicates a break at which one or more circuit blocks 114 may be inserted in accordance with the desired number of words in the memory 12. Since all blocks 114 are identical only the upper one is described in detail although reference is made to the succeeding ones in describing the read out operation. The circuit of FIGURES 10*a* and 10*b* is schematically represented by a simplified block shown in FIGURE 1*a* and labelled 18 and which has smaller internal blocks labelled 114.

It is noted that six lines extend from the right-hand side of each circuit block 114. The upper line designated 204 is the same line 204 referred to in the description of circuit block 104 in FIGURE 6*a*. B pulses applied to this line cause data in the associated circuit blocks 104 to be shifted to the left on lines 168 to a next adjacent circuit block 100 or 102.

The line 204 includes a gate element 300 having a control winding formed by a line 301. A line 302 branches from the line 204 and runs through a gate element 303 to ground. The element 303 has, for a control winding, a line 304.

The lower line 42 is the same line 42 referred to in circuit 100 shown in FIGURE 5*a*. A pulses on this line 42 effect the shifting of data from the associated circuit blocks 100 to the left via the lines 170 to a next succeeding circuit block 104.

The line 42 includes a gate element 305 having for a control winding the line 301. A line 306 branches from the line 42 and runs through a gate element 307 to ground. The gate element 307 has for a control winding the line 304.

The lines 301 and 304 are selectively connectable by a switch 308 to a constant current source represented by a terminal 309. With the switch connected to the line 304, the gate elements 303 and 307 are inhibited whereby all current pulses applied to the lines 204 and 42 continue to flow in those lines. With the switch connected to the line 301, the current pulses are diverted through the lines 302 and 306 to ground.

In the first described embodiment, the switch is connected to the line 304. Further reference to these circuits will not be made until a second embodiment is described. But for the second embodiment, the circuit comprising elements 300–309 would not be required. This circuit merely adapts the control unit 18 for a dual purpose.

The line 146 is the same line 146 referred to in circuit block 100 shown in FIGURE 5*a*. A D pulse applied to the line 146 is effective to read out the contents of the associated circuits 100 and 102, which it passes through serially.

The lines 158 and 176 are the same lines 158 and 176 referred to in the description of circuits 100 and 102 shown in FIGURES 5*a* and 7*a*. As described hereinbefore, if there is a match condition between all characters in the AIR and all characters in the particular memory word, current remains on the corresponding line 158 and flows into the circuit block 114. If a mismatch is found in any one of the circuit blocks 100 or 102 in the memory word, the current is diverted from the line 158 to the corresponding line 176.

The line 214 is the same line 214 referred to in the circuit block 102 shown in FIGURE 7*a*. Current on this line in response to a C pulse applied to the line 210 in FIGURE 7*a* indicates that the ST character stands in the associated circuit block 102.

Each circuit block 114 includes three cryogenic flip-flops designated 312, 314 and 316. The flip-flop 312 includes a circuit loop 318 having a left-hand leg 320 and a right-hand leg 322. Current in the left-hand leg is arbitrarily designated 1 and current in the right-hand leg is designated 0. The two legs 320 and 322 are common connected to a constant current source represented by terminal 324. The current applied to the terminal 324 flows through the flip-flops 312 in all circuit blocks 114 to ground. The leg 320 includes a gate element 326 and forms the control windings for three gate elements 328, 330 and 332. The right-hand leg 322 includes a gate element 334 and forms the control windings for three gate elements 336, 338 and 340. The line 214 forms the control winding for the gate element 326 in the leg 320.

The line 158 forms the control winding for a gate element 342. The line 176 includes a gate element 344 and forms the control winding for a gate element 346.

The flip-flop 314 includes a circuit loop 350 comprising a left-hand leg 352 and a right-hand leg 354. These two legs are common connected to a constant current source represented by a terminal 356. The circuit loops 350 of the flip-flops 314 in all circuit blocks 114 are series connected between the current source 356 and ground. The right-hand leg 354 includes a gate element 358 and forms the control winding for a gate element 360. The left-hand leg 352 includes a gate element 362 and forms the control winding for a gate element 364.

The flip-flop 316 includes a circuit loop 366 consisting of a left-hand leg 368 and a right-hand leg 370. The circuit loops 366 of the flip-flops 316 in all circuit blocks 114 are connected in series between a constant current source represented by a terminal 372 and ground. The left-hand leg 368 includes a gate element 374 and forms the control winding for a gate element 376. The right-hand leg 370 includes a gate element 378 and forms the control winding for a gate element 380.

A line 382 passes through all circuits 114 to ground forming the control windings for the gate elements 344. D pulses applied to this line reset mismatch indicating current from line 176 to line 158. A line 384 passes through all circuits 114 to ground and includes the gate element 364 in each flip-flop 314. At terminals 386 to the left of each gate element 364, the line 384 branches to form the previously described lines 146. Each line 146 passes through the corresponding flip-flops 316 and 314 forming the control winding for gate element 378 in the former and including the gate element 360 in the latter. D pulses are applied to line 384.

A line 388 passes through each of the circuits 114 to ground and forms the control winding for the gate element 374 in each of the flip-flops 316 to reset to their 0 states any flip-flops 316 which are in their 1 states. A pulses are applied to line 388.

An individual line 390 enters each circuit 114 at the top and branches at a terminal 392 into lines 394 and 396. The line 394 includes the gate element 336 in a corresponding flip-flop 312 and is connected to ground. The line 396 includes the gate element 328 in the corresponding flip-flop 312 and branches at a terminal 398 into lines 400 and 402. The line 400 includes the gate element 342 and is connected to ground. The line 402 includes the gate element 346, a gate element 347 and forms the control winding for gate elements 358 in flip-flop 314. Between gate elements 346 and 347, a line 403 branches from the line 402. The line 403 includes a gate element 405 and is connected to ground. The previously described lines 286 and 288 form control windings for gate elements 405 and 347 respectively in all circuits 114. Current constantly applied to the line 292 in FIGURES 1*b*, 9*a* and 9*b* is switched from the line 288 to the line 286 each time the ST character stands in circuit 112. At such times, the current on line 286 gates the C pulse on a line 390 through gate element 347, provided that the memory word associated with that line 390 contains data matching the AIR data.

A line 404 enters each circuit 114 at the left and branches at a terminal 406 into lines 408 and 410. E pulses are applied to line 404. The line 410 includes the gate element 380 in flip-flop 316 and forms the control winding for gate element 362 in flip-flop 314 and the control winding for gate element 334 in flip-flop 312. Line 410 then continues to ground. Current on the line 410 sets flip-flop 314 to its 0 state, whereas it sets flip-flop 312 to its 1 state.

A line 412 enters each circuit 114 at the left and branches at a terminal 414 into a line 416 and the previously described line 204. B pulses are applied to line 412. The line 416 includes the gate element 330 in flip-flop 312 and is connected to ground. The line 204 includes the gate element 338 in flip-flop 312.

A line 418 enters each circuit 114 at the left and branches at a terminal 420 into a line 422 and the previously described line 42. A pulses are applied to line 418. The line 422 includes the gate element 332 in flip-flop 312 and is connected to ground. The line 42 includes the gate element 340 in flip-flop 312.

*Pulse generator 22*

Figure 11:
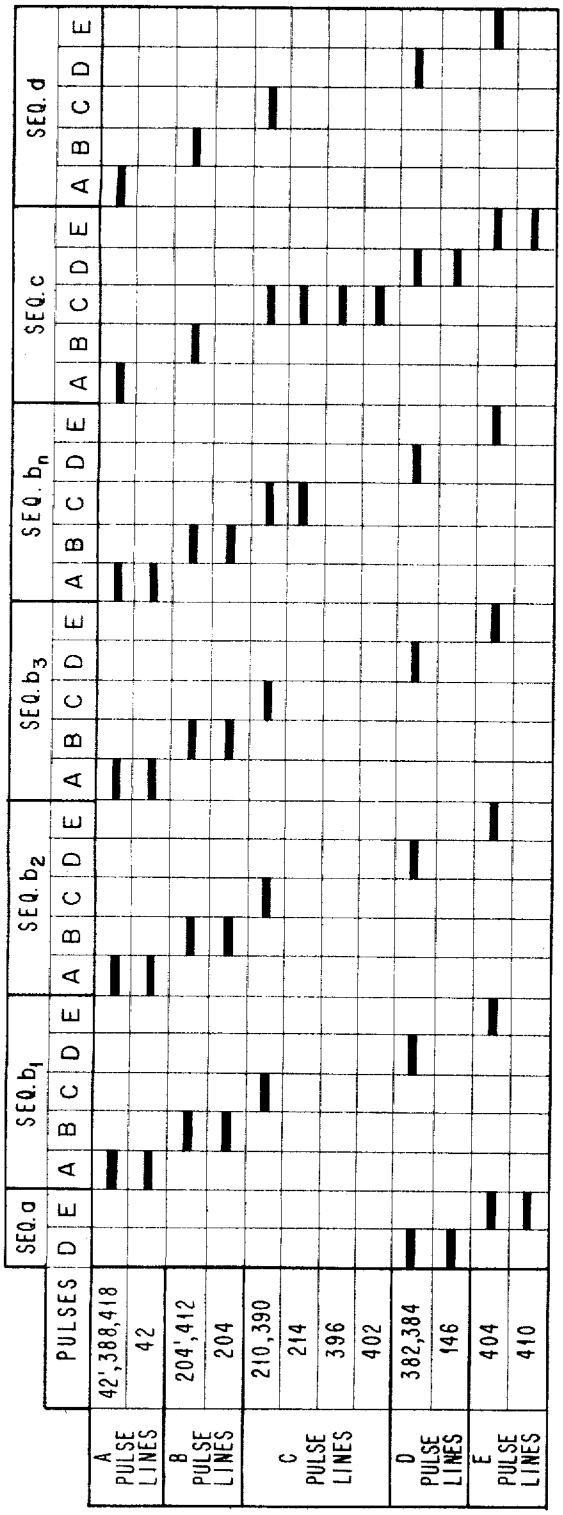
FIGURE 11 is a timing chart.

Referring to FIGURE 1*a*, the pulse generator 22 is shown merely as a box having lines leading therefrom. Since pulse generators are well known and it is possible to generate any desired sequence of pulses, further description of a pulse generator is not given. Reference may be had to FIGURE 11 which is a timing chart showing the sequence of pulses.

*System*

Referring to FIGURES 1*a*, 1*b* and 1*c*, the block representations of the circuits illustrated in detail in FIGURES 5*a* through 10*a* are assembled as a composite with the input and output lines of the various circuit blocks interconnected to form the system.

A line 204 emerging from each circuit 114 extends sequentially through the circuits 104 of the associated memory word and is grounded to the right of the last circuit 104. The lines 146, 158 and 176 extending from each circuit 114 run sequentially through an associated circuit 102 and a series of associated circuits 100. The line 146 is grounded to the right of the last circuit 100 (FIGURE 1*c*). The line 176 is connected to the line 158 which is connected to the terminal 173 (FIGURE 1*c*) which represents a constant current source.

A line 210 corresponding to each circuit 102 extends from the pulse generator 22. A line 214 corresponding to each line 210 extends from each circuit 102 to the corresponding circuit 114.

A line 42 extends from each circuit 114 to the left-hand block 100 of a corresponding memory word and through associated circuits 100 to ground in FIGURE 1*c*.

A circuit 104 is connected by a cable 170 to each circuit 100. Each circuit 100 except the one on the right is connected by a cable 168 to a circuit 104. The circuit 102 also is connected by a cable 168 to a circuit 104. The right-hand circuit 100 is connected to the input unit 10 by a cable 168.

The input unit 10 which provides data inputs to the word memory 12 may be apparatus adapted to receive information from a number of input lines. For example, the unit 10 may receive information from any individual airlines reservation offices on individual input lines. Each input line may be connected to one of the cables 168 to introduce reservation request data into a particular memory word.

The input unit, unless buffering is provided, would operate at a character rate corresponding to the A, B, C, D and E pulse cycle rate. The data received by the unit 10 may be in bursts of one message each or may be provided with switching means to enter successive messages into empty memory words.

If desired, data may be gated from the unit 10 into the first circuit 100. This gating may be accomplished by providing gates similar to the one described hereinbefore with reference to FIGURES 3*a* and 3*b*, in the input lines and by operating these gates by the A shift pulses on line 42, which would be extended through the additional gates.

An intermediate storage circuit 104 would be required between the foregoing gates and the first circuit 100. In this case, lines 170 would lead from the input unit 10 to the circuit 104. Shifting of data from this circuit 104 would be accomplished by an extension of the line 204 which carries the B shift pulses.

However, for the purpose of this invention it is assumed that a second message is not applied by the input unit 10 to any one input cable 168 until the preceding message has been read out of the corresponding memory word. If it was desired, and with appropriate circuit alterations within the skill of the art, the words could be entered into the memory in parallel rather than by serial, character-by-character shifting.

The previously described cables 164 extend from the lowermost circuit blocks 100 and 102, through the vertical columns of circuits 100 and 102 to the output unit 20. As shown in FIGURES 5*a* and 7*a*, each cable 164 consists of six pairs of lines.

The previously described cables 166 extend from the circuits 110 through the circuits 100 arranged vertically thereabove and from the circuit 112 through the circuits 102 arranged vertically thereabove. The cables 166 are connected to ground where they emerge from the circuits 102 and 100. As shown in FIGURES 5*a* and 7*a*, each cable 166 consists of six pairs of lines, the lines of each pair being common connected to ground.

In the AIR unit 16, the line 204′ extends from the pulse generator 22 sequentially through the circuits 104 to ground. A circuit 104 is connected between adjacent pairs of circuits 110 by cables 170′ and 168′ similar to the connection in the memory unit 12. Similarly, a circuit 104 is connected between the left-hand circuit 110 and the circuit 112.

The previously described line 246 which extends through the read out loops of the flip-flops in circuits 112 and 110 extends from a constant current source, represented by a terminal 247, sequentially through the circuit 112 and the circuits 110 to ground. The line 292 starts at a constant current source terminal 299 at the left of circuit 112 and, within this circuit 112, branches into 286 and 288 which extend through the control circuit 18 as described hereinbefore with reference to FIGURES 10*a* and 10*b*, to ground in FIGURE 1*a*.

The previously described line 249 which carries current for indicating the presence of a mask character in the circuits 110 extends from a constant current source terminal 251, in FIGURE 1*b*, sequentially through all circuits 110 to ground in FIGURE 1*c*. A line 42′ extends from the pulse generator 22 sequentially through all circuits 110 to ground in FIGURE 1*c*. A pulses applied to this line 42′ effect transfer of data from the circuits 110 to the following circuits 104.

*System operation*

Referring to the upper part of FIGURE 12, the data from the input unit 10 may consist of an ST character, a flight number, a number indicating the city of origin of the flight, a number indicating the city of destination, the date of the flight by month and day, the number of seats required and a number identifying the requesting reservations office. The corresponding data in the AIR 16, shown in the lower part of FIGURE 12, is an ST character, flight number, origin number, destination number, flight date, and mask characters M in the spaces corresponding to the spaces in the memory word which contains the number of seats required and the requesting office identification.

When a customer at a remote reservations office requests accommodations between the origin and destination cities, on a particular flight, on a particular date and for a specified number of seats, the reservations clerk enters the data onto his transmission line. The data are received by the input unit 10 and entered into a particular word of the memory unit 12. The data previously in the particular word registers remains there until shifted out character-by-character by the shifting in of new data. The term "shifting of data into a register," means shifting it completely into a predetermined position such as the position where the ST character stands in the left hand register.

The ST character is applied parallel-by-bit to the input lines 168 and is thus recorded in the flip-flops of the first or right-hand circuit 100. Thereafter, during the next sequence of A, B, C, D, and E pulses, the A pulse writes the character from the first circuit 100 into the first circuit 104. The following B pulse writes the character from this first circuit 104 into the next following circuit 100. In a second sequence of pulses, the A pulse now writes the character from the second circuit 100 into the second circuit 104 and at the same time writes a second character into the first circuit 100. The following B pulse then writes the characters from the first and second circuits 104 into the second and third circuits 100.

Succeeding sequences of pulses continue to shift data from the circuits 100 to the left while new data are inserted into the first circuit 100 from the input unit 10. This shifting continues until the ST character, which was the first character introduced into the memory word, is shifted from the preceding circuit 104 into the circuit 102 by a B pulse. The next following C pulse on line 210 passes through the ST character recognition circuit and emerges from the circuit 102 on the line 214, thus indicating that the ST character is in the circuit 102.

As described hereinbefore, the current on line 214 sets the flip-flop 312 of the corresponding circuit 114 to its 0 state. In its 0 state, the flip-flop 312 inhibits further shifting of data in the associated word by A and B pulses. The 0 state of the flip-flop 312 also permits the last mentioned C pulse and subsequent C pulses applied to line 390 and gated by current on line 286, which indicates that an ST character stands in the left-hand position of the AIR, to initiate read out of the memory word data when a match indicating current is on the line 158 at C pulse time.

Concurrently with the shifting of data in the memory word, the A and B pulses of the same sequences of pulses are shifting data through AIR 16 from the input unit 14. The hereinbefore described data for each flight, for example, for a thirty day period, are repetitively passed through the AIR. Once during each sequence of pulses an attempt is made, utilizing the C pulse on the lines 390, to associate the data in the AIR with the data in all words of the memory 12. As described hereinbefore, this association is inhibited by current on line 288 during each cycle wherein the circuit 112 does not contain an ST character.

Each time an ST character does stand in circuit 112, current from the terminal 299 flows through the line 292 to the line 286 to divert C pulses applied to lines 390 from the lines 403 to the lines 402 of all circuits 114.

Since the two right-hand circuits 110 contain mask characters M in the given example of FIGURE 12, current from the source 251 flows through the line 249 and through the line 250 of those two circuits 110, rendering gate elements 260 resistive and inhibiting the flow of current from corresponding lines 272 to corresponding lines 268. The currents on the lines 268 in all circuits 110 and 112, except the two right-hand circuits 110, then flow through lines 166–0 or 166–1 in accordance with the contents of the associated flip-flops 230. These currents continue on the lines 166 through all the memory words for comparison, in the manner described hereinbefore, with the contents of those memory circuits.

When the request data such as is shown in FIGURE 12 stands in a memory word and when the AIR data shown in FIGURE 12 corresponding thereto stands in the AIR, association between the ST character, flight number, origin number, destination number and date produces a match indication on a line 158. At C pulse time, current on line 158 gates a C pulse on a corresponding line 390 to actuate the readout circuits to read the matched word from the memory to the output unit 20. As described hereinbefore the mask characters M inhibit comparison with the number of seats required and the requesting office designation.

It will be apparent that the ST character serves as an interlock to assure that a combination of the last part of one word and the first part of a second word in a memory register and/or in the AIR does not, by chance, form a sequence of data which erroneously compares with other data, either valid or erroneous.

Referring to FIGURES 10*a* and 10*b*, the match and read out circuits operate as follows: current is constantly applied to the line 158 from the terminal 173 whereby, when matching words stand in the AIR and in a particular memory word register, the current remains on the corresponding line 158 thus holding the gate element 342 in the circuit 114 resistive. The current on line 286 holds gate element 405 resistive. Thus, the next C pulse on line 390 is permitted to flow through gate elements 346 and 347 in line 402 to switch the flip-flop 314 to its 1 state.

The next following D pulse applied to line 384 is inhibited, by the 1 state of flip-flop 314, from continuing on the line 384 and is direvrted through the read out line 146 and the now superconductive gate element 360 in flip-flop 314. The current on line 146 flows sequentially through the gate circuits 46′ and read out loops 140 of the circuits 102 and 100. Currents from the gate circircuits 46′ flow through the lines 164 and emerges on the 0-designated or 1-designated lines 164 in accordance with the contents of the corresponding flip-flops in the circuits 100 and 102.

Although not a part of the present invention, the manipulation of data read to the output unit, including the number of seats required and the requesting office identification, may be as follows: the number of seats required on the particular flight is compared in the output unit with the number of seats available on that flight. If sufficient seats are available, a confirmation is transmitted to the requesting station (by means not shown) and the number of seats assigned is subtracted in the memory from the number of seats available.

Referring to FIGURE 11, a timing chart is shown. Across the top of the chart pulse sequences *a*, $b_1$, $b_2$, $b_3$ . . . $b_n$, *c* and *d* are shown. Only the last two pulses D and E of Seq. *a* are shown. Along the left side of the chart circuit line numbers are shown grouped according to the pulses which they receive. The lines receiving the A pulses are grouped at the top followed by those receiving B pulses, C pulses, D pulses and E pulses. The lines identified in the first row of each pulse group are those lines which receive the respective A, B, C, D and E pulses during each and every sequence of pulses. The lines arranged thereunder are lines that receive pulses only at the times indicated in the timing chart.

Referring to FIGURES 1*a*, 1*b*, 1*c* and 11, the operation of the system is described in detail. As a starting point, assume that a word has just been read from the top memory word register by the D pulse of Seq. *a* on lines 384. This D pulse applied during each sequence to the line 384 is diverted to the line 146 of the top memory word to read out the data in the corresponding word register. The E pulse in Seq. *a* is diverted from the line 404 to the line 410 by the 1 state of flip-flop 316, to reset flip-flops 314 and 312 to their 0 and 1 states respectively.

The A pulse of Seq. $b_1$ applied to the line 388 resets flip-flop 316 to its 0 state rendering gate element 380 in flip-flop 316 resistive and diverting the E pulses of subsequent sequences from the line 404 to ground via line 408.

Since flip-flop 312 was set to its 1 state during Seq. *a*, the A and B pulses of Seq. $b_1$ and subsequent subsequences $b_2, b_3 \ldots b_n$ on the lines 418 and 412 respectively, flow in the lines 42 and 204 respectively, to shift data successively through the circuits 100 and 104 until an ST character is shifted into the circuit 102 by a B pulse during Seq. $b_n$. Note that the B pulse in Seq. $b_1$ shifted a different character into the circuit 102 thus replacing the ST character and removing the shift interlock.

The C pulses of sequences $b_1, b_2, b_3 \ldots b_n$ applied to the line 390 flow through the gate element 336 to ground since the flip-flop 312 is in the 1 state. During Seq. $b_n$, the B pulse applied to line 204 shifts the ST character into the circuit 102. The C pulse applied on the line 210 during Seq. $b_n$ detects the ST character and emerges on the line 214. This C pulse renders the gate element 326 resistive, thus switching flip-flop 312 to its 0 state wherein the gate elements 338 and 340 are rendered resistive and subsequent A and B pulses on lines 418 and 412 are diverted to ground thus preventing further shifting of data in the related word register.

During each of the sequences $b_1, b_2, b_3 \ldots b_n$, the D pulse applied to the line 382 rendered gate element 344 resistive to assure that current is in the line 158 and not in the line 176.

During each sequence of pulses, the data in the AIR is being shifted one character position to the left by A and B pulses on lines 42′ and 204′ respectively. During these sequences of pulses, the C pulses applied to the lines 390 are inhibited by current in line 288 from reaching flip-flop 314 even if the pulse did get past gate element 346.

While a number of pulse sequences may elapse between the time the ST character enters a circuit 102 and the time an ST character is shifted into circuit 112 of the AIR, it is assumed that this character enters circuit 112 during Seq. *c*.

If the ST character had been shifted into both the circuits 102 and 112 during the same sequence, Seq. $b_n$, the matching data would be read out of that memory word during Seq. $b_n$. However, since it has been assumed that the ST character is shifted into circuit 102 during Seq. $b_n$ and into circuit 112 during Seq. *c*, the read out of the matching word will occur during Seq. *c*.

During Seq. *c*, the A pulse on the line 42′ shifts the ST character from the left-hand circuit 110 into the adjacent circuit 104. The B pulse on line 204′ during Seq. *c* shifts the ST character into the circuit 112. The C pulse on line 210 during Seq. *c* again flows in the line 214 but is ineffective since the flip-flop 312 was already set to its 0 state during Seq. $b_n$.

Since data in the AIR and in a particular memory word corresponds, the currents in lines 166 correspond to the data in the associated flip-flops of circuits 100 and 102. Therefore the current remains in line 158 and gate element 346 in the corresponding circuit 114 is superconductive. The S character is in circuit 112 so gate 347 is superconductive.

The C pulse applied to line 390 of the circuit 114 flows through the lines 396 and 402 to set the corresponding flip-flop 314 to its 1 state.

The D pulse applied to line 382 during Seq. *c* is ineffective since current already flows in line 158. The D pulse applied at this time to line 384 is diverted from the line 384 by the resistive state of gate element 364 in flip-flop 314 and flow through the associated line 146 to read out the data in the corresponding memory word register in the manner described hereinbefore.

An E pulse applied to line 404 during Seq. *c* flows through the line 410 as described in Seq. *a*, resetting flip-flop 314 to its 0 state and flip-flop 312 to its 1 state.

While the last cited sequence of A, B, C, D and E pulses is shifting data in the AIR and reading out the matching data from one memory word, the same sequence or pulses may be shifting data in other memory words.

If the second memory word had contained the same matching data as that in the first memory word, the D pulse on line 384 during Seq. *d* would reach the circuit 114 associated with the second word, to read that word out of memory. Readout of the second word is accomplished in a similar manner. The flip-flop 312 in the circuit 114 corresponding to the second memory word would have been set during an earlier sequence to its 0 state by current on its line 214, indicating that an ST character was in the corresponding circuit 102. During Seq. *c*, the match indicating current on the corresponding line 158 would have permitted the C pulse applied to line 390 to set the corresponding flip-flop 314 to its 1 state.

The D pulse on line 384 during Seq. *d* would flow through the gate element 364 of the first circuit 114 to the second circuit 114, since flip-flop 314 of this first circuit 114 was reset to its 0 state by the E pulse of Seq. *c* on line 410. Since the second flip-flop 314 is now in its 1 state, the current is diverted at terminal 386 in the second circuit 114 to the line 146 to read out the data in the corresponding memory word.

*Alternate embodiment*

Figure 13:
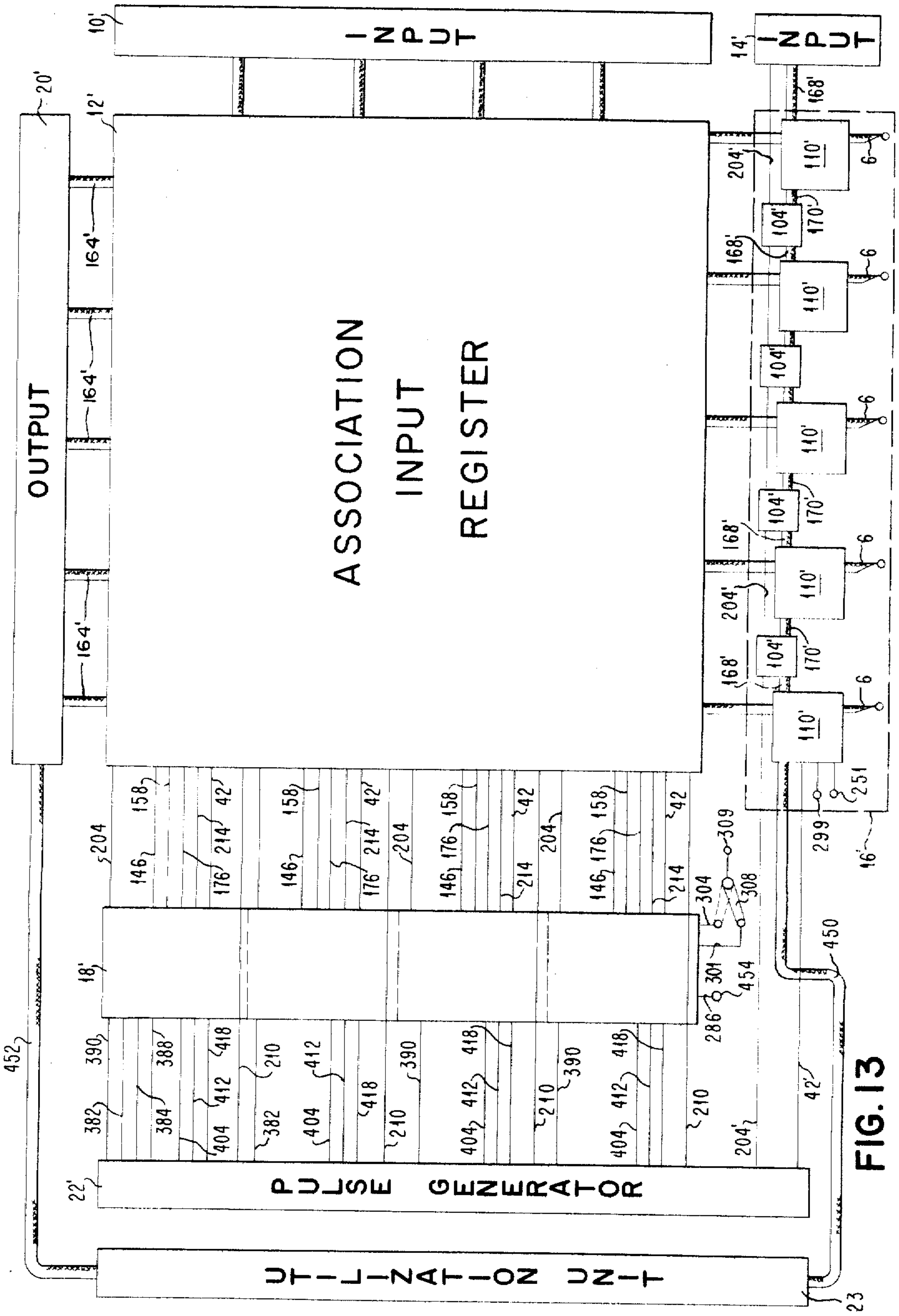
FIGURE 13 is a block representation of an alternate embodiment of the invention.

Referring to FIGURE 13, a system is shown, in schematic form, which is very similar to the system shown in FIGURES 1*a*, 1*b* and 1*c*, but which operates in a different mode. In effect, the roles of the memory unit 12 and the AIR 16 are reversed whereby the memory 12′ in FIGURE 13 becomes a multiple word association input register and the AIR becomes a shift register 16′ through which data are streamed for comparison with the multiple AIR words.

In a particular application of this system, the association words stored in the AIR 12′ are key words which are used to monitor the data streaming through the shift register unit 16′. This system may be used where, for example, data are being streamed through the shift register unit 16′ and it is desired to identify those portions of the stream of data which refer to particular subjects which are associated with the key words in unit 12′.

For example, various word registers in the AIR 12′ may contain the words atomic, missile, sabotage, etc. When a key word is detected, it is desired to mark the portion of the streamed data in which that word occurred for closer examination at some later time. Therefore, each time a match is made between a key word in the AIR 12′ and the data streaming through the shift register unit 16′, the record of the streamed data is marked in accordance with the particular key word which was matched.

Referring to FIGURE 13, the alternate system includes an input unit 10′, a multiple word AIR unit 12′, an input unit 14′, a shift register unit 16′, a control unit 18′, an output unit 20′, and a pulse generator 22′, all of which generally correspond structurally to the units in FIGURES 1*a*, 1*b* and 1*c* having the identical but unprimed reference numbers. In addition to the foregoing units, the alternate system includes a utilization unit 23 which is connected by cables 450 and 452 to the units 16′ and 20′ respectively.

The unit 10′ may be a keyboard or other suitable device for entering association or key words one at a time into the various registers of the AIR unit 12′. The input unit 14′ may be, for example, a transmission line or a document reader which feeds data continuously through the shift register unit 16′.

The shift register unit 16′ is identical to the AIR 16 of FIGURES 1*a*, 1*b*, and 1*c* except that the circuit 112 in unit 16 has been replaced by another circuit 110. This circuit 110 is identical to the other circuits 110 and is connected in series with them. The usual cable 170′ emerging from the left-hand side of the left-hand circuit 110 (see FIGURE 8*a*) is replaced by the cable 450.

The line 286 associated with the circuit 112 in FIGURES 1*a*, 1*b* and 1*c* is now connected to a constant current source represented by a terminal 454 and leads into the control unit 18′ to perform the function previously described in connection with the first embodiment. The line 288 used in the circuit of the first embodiment is not required and may be merely disconnected.

In other respects the system shown in FIGURE 13 is structurally identical to that shown in FIGURES 1*a*, 1*b* and 1*c*.

*System operation*

In order to shift association words into the AIR 12′, the switch 308 is connected to the line 304 whereby the A and B pulses applied to the lines 42 and 204 respectively are operative to shift the input data from the input unit 10′ into the AIR 12′.

After the association words are in the AIR, the switch 308 is connected to the line 301 to prevent subsequent A and B pulses from shifting the data in the AIR. It will be apparent that shifting of individual words into the AIR registers while holding other words therein may be accomplished simply by providing individual switches 308 to individual lines 301 and 304 associated with the individual registers.

With the association words stored in the AIR 12′, data are streamed from the input unit 14′, through the circuits 110′ of the shift register unit 16′ and through the lines 450 to the utilization device 23 which may be, for example, a magnetic tape storage unit. Here all the data streamed through the unit 16′ are recorded. The streaming of data through the unit 16′ is continuous and is accomplished by A and B pulses on the lines 42′ and 204′ respectively.

As the data are streamed through the shifting register 16′ in a character-by-character shifting fashion, a comparison is made with the association words following each character shift operation. When a match is made, it is desirable to mark the particular portion of streamed data for closer examination. Therefore, when a match is made between an AIR word and a portion of the data streaming through the unit 16′, an output is derived on the lines 164′ to the output unit 20′. This output may include an identification of the particular word which was matched. An output from the unit 20′ on the lines 452 is fed into the utilization unit 23. The arrival of the identifying data on the lines 452 may be timed to coincide with the arrival of the associated data on the lines 450. The identifying data are recorded for example, in a separate track on the magnetic tape in unit 23, alongside that portion of the data in which the word was detected. It is then possible to scan this channel of the magnetic tape at a later time for a particular identification and thus identify those portions of the recorded data which contain a desired key word.

In this alternate embodiment, it is noted that the ST character is not utilized in the unit 16′ and therefore the data are compared after each character shift operation with all key words in the AIR 12′. Thus, the function of alternate shifting and comparing is illustrated.

While the invention has been particularly shown and described with reference to preferred embodiments thereof, it will be understood by those skilled in the art that various changes in form and details may be made therein without departing from the spirit and scope of the invention.

What is claimed is:

1. Data comparing apparatus comprising, in combination, a memory consisting of a plurality of multiple-character word registers,
means for entering word data into said word registers,
a multiple-character association register,
means for shifting word data character-by-character through said association register,
means operable after each character shift operation for comparing the word in said association register simultaneously with the words in all said word registers,
and means for reading out the word in any of said word registers when matched by the word in said association register.

2. The apparatus of claim 1 wherein said means for reading out matching words is operative, when there are plural matching words, to read said matching words out sequentially.

3. The invention of claim 1 wherein said means for reading out matching words, said means for shifting word data, and said means for comparing words are operable concurrently to read out a previously matched word from one said word register while comparing shifted association register data with words in other said word registers.

4. The invention of claim 1 wherein said means for entering word data into said word register and said means for comparing words are operable concurrently to compare an association register word with words entered in some word registers of said memory while entering words into other said word registers.

5. Data comparing apparatus comprising, in combination, a memory consisting of a plurality of multiple-character word registers,
means for generating repetitive sequences of pulses,
a source of word data for said word registers,
means operable by pulses of said sequences for entering words from said source into said word registers,
a multiple-character association register,
a source of word data for said association register,
means operable by pulses of said sequences for shifting words character-by-character from second said source through said association register,
means operable by pulses of said sequences for comparing, between shift operations, the word in said association register simultaneously with the words in all said word registers,
means operable by pulses of said sequences for registering a matching condition between said association register word and the word in one or more of said word registers,
and means operable by pulses of said sequences for reading said matching words from said word registers.

6. Data comparing apparatus comprising, in combination, a memory consisting of a plurality of multiple-character word registers,
means for generating repetitive sequences of pulses,
a source of data words for said memory, each said word having a start character and information characters,
means operable by pulses of said sequences for shifting words from said source character-by-character into said word registers, said words being shifted one character during each said sequence, means associated with each said word register for detecting when said start character reaches a predetermined position in said word register and for stopping said shifting,
a multiple-character association register,
a source of data words for said association register, each said word having a start character and information characters,
means operable by pulses of said sequences for shifting data words character-by-character from second said source through said association register, said data words being shifted one character during each said sequence,
means for detecting when said start character reaches a position in said association register corresponding to said predetermined position in said word registers,
means controlled by last said detecting means and operable during the sequence of pulses during which said start character was shifted into said corresponding position for comparing said association register data word simultaneously with the words in all said word registers,
means operable for registering a matching condition between said association register data word and the word in one or more of said word registers,
and means operable for reading said matching words from said word registers.

7. The invention of claim 6 in which said association data words include
mask characters,
means for detecting said mask characters,
and means for inhibiting comparison of said mask characters with information characters in corresponding character positions of said word registers while permitting comparison with all other characters in said word registers.

8. Data comparing apparatus comprising, in combination,
a memory consisting of a plurality of multiple-character word registers,
means for entering a data word into each said word register,
a multiple-character association word register,
means for passing data words serially through said association word register in a character-by-character shifting fashion,
means for detecting when a data word is registered in said association word register,
means for attempting, after each character shift operation, to compare the data in said association word register simultaneously with the data words in all said memory word registers and operable under control of said detecting means to make said comparison when a data word is registered in said association word register,
means operable for registering a matching condition between the data word in said association word register and the data word in one or more of said memory word registers,
and means operable for reading said matching data words from said memory word registers.

9. The invention of claim 8 in which said association register data words include
mask characters,
means for detecting said mask characters, and
means for inhibiting comparison with characters of data words in corresponding positions of said memory word registers while permitting comparison corresponding positions of said memory word registers.

10. Data comparing apparatus comprising, in combination,
a memory consisting of a plurality of multiple-character registers,
means for generating repetitive sequences of pulses,
a source of character data for said memory registers,
means operable by pulses of said sequences for entering characters from said source into said memory registers,
a multiple-character association register consisting of a plurality of main storage units, one for each said character, arranged in a line, and a plurality of intermediate storage units, one associated with each pair of adjacent said main storage units, each said main storage unit and each said intermediate storage unit being operative to store a character, said association register being operable by one pulse of each said sequence of pulses for entering the contents of each said main storage unit except the last one in said line into an adjacent said intermediate storage unit, and being operable by a following pulse of each said sequence of pulses for entering the contents of each said intermediate storage unit into an adjacent said main storage unit, whereby data are shifted character-by-character through said association register,
means operable by another pulse of said sequence of pulses for comparing, during each sequence of pulses, the data in said main storage units of said association register simultaneously with the data in all said memory registers,
means operable by a pulse of each said sequence for registering a matching condition between said association register data and the data in one or more of said memory registers,
and means operable by a pulse of each said sequence for reading said matching data from said memory registers.

11. The invention of claim 10 wherein each said memory register similarly consists of
a plurality of main and intermediate storage units operable by pulses of said sequences for shifting data character-by-character into said register,
means for detecting when a unit of said data is in said memory register,
and means for inhibiting further shifting of said data in said memory register.

12. Data comparing apparatus comprising, in combination,
an association register unit consisting of at least one multiple character word register,
means for entering data into said word register,
a multiple character shifting register having character positions corresponding to character positions in said word register,
means for shifting data character-by-character through said shifting register,
means for comparing data in said word register with data in said corresponding positions of said shifting register after each character shift operation,
and means for indicating when data in said word register is matched by data in said shifting register.

13. Data comparing apparatus comprising, in combination,
an association register unit consisting of a plurality of multiple-character association registers,
means for generating repetitive sequences of pulses,
a source of data characters for said association registers, means operable by pulses of said sequences for entering data characters from said source into said association registers,
a multiple-character shifting register having character positions corresponding to character positions in said association registers,
a source of data characters for said shifting register,
means operable by pulses of said sequences including means for shifting data character-by-character from second said source through said shifting register,
means operable during each sequence of pulses for comparing characters in said shifting register simultaneously with characters in corresponding positions of all said association registers, means for registering a matching condition between data in said shifting register and the data in one or more of said association registers, and means for reading said matching data from said association registers.

References Cited by the Examiner

UNITED STATES PATENTS

| | | | |
|---|---|---|---|
| 2,735,082 | 2/1956 | Goldberg et al. | 340—172.5 |
| 2,798,216 | 7/1957 | Goldberg et al. | 340—172.5 |

| | | | |
|---|---|---|---|
| 2,923,921 | 2/1960 | Shapin | 340—172.5 |
| 2,996,699 | 8/1961 | Kramskoy | 340—172.5 |
| 3,018,472 | 1/1962 | Piloty | 340—172.5 |

OTHER REFERENCES

Pages 106–121, April 1961, Kiseda, "A Magnetic Associative Memory," IBM Journal.

ROBERT C. BAILEY, *Primary Examiner.*

MALCOLM A. MORRISON, *Examiner.*

W. M. BECKER, P. J. HENON, *Assistant Examiners.*